US012604387B2

(12) United States Patent
Shumlak et al.

(10) Patent No.: US 12,604,387 B2
(45) **Date of Patent: \*Apr. 14, 2026**

(54) PLASMA CONFINEMENT SYSTEM AND METHODS FOR USE

(71) Applicant: UNIVERSITY OF WASHINGTON, Seattle, WA (US)

(72) Inventors: Uri Shumlak, Seattle, WA (US); Brian A. Nelson, Seattle, WA (US); Raymond Golingo, Seattle, WA (US)

(73) Assignee: University of Washington, Seattle, WA (US)

( \* ) Notice: Subject to any disclaimer, the term of this patent is extended or adjusted under 35 U.S.C. 154(b) by 129 days.

This patent is subject to a terminal disclaimer.

(21) Appl. No.: 18/391,847

(22) Filed: Dec. 21, 2023

(65) Prior Publication Data

US 2024/0161938 A1 May 16, 2024

Related U.S. Application Data

(62) Division of application No. 18/150,255, filed on Jan. 5, 2023, now Pat. No. 12,245,351, which is a division (Continued)

(51) Int. Cl.
| | |
|---|---|
| *H05H 1/06* | (2006.01) |
| *G21B 1/05* | (2006.01) |
| *H05H 1/04* | (2006.01) |

(52) U.S. Cl.
CPC ............... *H05H 1/06* (2013.01); *H05H 1/04* (2013.01); *G21B 1/05* (2013.01); *Y02E 30/10* (2013.01)

(58) Field of Classification Search
None
See application file for complete search history.

(56) References Cited

U.S. PATENT DOCUMENTS

| | | | |
|---|---|---|---|
| 3,029,361 A | 4/1962 | Hernqvist | |
| 3,265,583 A | 8/1966 | Baker et al. | |

(Continued)

FOREIGN PATENT DOCUMENTS

| | | |
|---|---|---|
| JP | 61-274292 A | 12/1986 |
| JP | 01-503020 A | 10/1989 |

(Continued)

OTHER PUBLICATIONS

Garcinuno et al., "Establishing technical specifications for PbLi eutectic alloy analysis and its relevance in fusion applications.", Nuclear Materials and Energy, 2022 vol. 30, 101146, 7 pages.

(Continued)

*Primary Examiner* — Srinivas Sathiraju
(74) *Attorney, Agent, or Firm* — McDonnell Boehnen Hulbert & Berghoff LLP

(57) ABSTRACT

An example method includes directing gas, via one or more first valves, from within an inner electrode to an acceleration region between the inner electrode and an outer electrode that substantially surrounds the inner electrode, directing gas, via two or more second valves, from outside the outer electrode to the acceleration region, and applying, via a power supply, a voltage between the inner electrode and the outer electrode, thereby converting at least a portion of the directed gas into a plasma having a substantially annular cross section, the plasma flowing axially within the acceleration region toward a first end of the inner electrode and a first end of the outer electrode and, thereafter, establishing a Z-pinch plasma that flows between the first end of the outer electrode and the first end of the inner electrode. Related plasma confinement systems and methods are also disclosed herein.

20 Claims, 15 Drawing Sheets

Related U.S. Application Data of application No. 16/487,338, filed as application No. PCT/US2018/019364 on Feb. 23, 2018, now Pat. No. 11,581,100.

(60) Provisional application No. 62/462,779, filed on Feb. 23, 2017.

(56) References Cited

U.S. PATENT DOCUMENTS

| | | | | |
|---|---|---|---|---|
| 3,309,873 | A | 3/1967 | Cann | |
| 3,318,094 | A * | 5/1967 | Koller | H05H 1/54 |
| | | | | 313/154 |
| 3,370,198 | A | 2/1968 | Rogers et al. | |
| 4,042,848 | A | 8/1977 | Lee | |
| 4,129,772 | A * | 12/1978 | Navratil | H05H 1/54 |
| | | | | 219/121.36 |
| 4,244,782 | A | 1/1981 | Dow | |
| 4,260,455 | A | 4/1981 | Moir | |
| 4,264,413 | A * | 4/1981 | Ohkawa | H05H 1/12 |
| | | | | 376/133 |
| 4,354,999 | A | 10/1982 | Priest | |
| 4,406,952 | A | 9/1983 | Molen et al. | |
| 4,663,567 | A * | 5/1987 | Wong | H05G 2/002 |
| | | | | 315/111.41 |
| 4,710,607 | A | 12/1987 | Wilhelmi | |
| 4,734,247 | A * | 3/1988 | Schaffer | H05H 1/12 |
| | | | | 376/133 |
| 4,912,731 | A | 3/1990 | Nardi | |
| 4,931,251 | A | 6/1990 | Watanabe et al. | |
| 6,414,438 | B1 | 7/2002 | Borisov et al. | |
| 6,452,194 | B2 * | 9/2002 | Bijkerk | H05G 2/007 |
| | | | | 378/119 |
| 6,486,593 | B1 | 11/2002 | Wang et al. | |
| 6,690,764 | B2 * | 2/2004 | Kondo | G03F 7/70916 |
| | | | | 378/119 |
| 6,829,261 | B2 * | 12/2004 | Kleinschmidt | G03F 7/70033 |
| | | | | 372/29.02 |
| 7,307,375 | B2 * | 12/2007 | Smith | H01J 65/048 |
| | | | | 313/31 |
| 7,679,025 | B1 | 3/2010 | Krishnan et al. | |
| 8,143,790 | B2 * | 3/2012 | Smith | H01J 65/048 |
| | | | | 315/111.11 |
| 9,934,876 | B2 | 4/2018 | McGuire | |
| 10,811,155 | B2 * | 10/2020 | Grossnickle | G21G 4/02 |
| 10,984,917 | B2 | 4/2021 | Laberge et al. | |
| 11,219,117 | B2 | 1/2022 | Shumlak | |
| 11,515,050 | B1 * | 11/2022 | Regan | H05H 1/2406 |
| 11,581,100 | B2 * | 2/2023 | Shumlak | H05H 1/06 |
| 11,758,640 | B2 * | 9/2023 | Shumlak | H05H 1/06 |
| | | | | 315/111.61 |
| 11,810,679 | B2 * | 11/2023 | Regan | H05H 1/2406 |
| 12,245,351 | B2 * | 3/2025 | Shumlak | H05H 1/04 |
| 2001/0004104 | A1 * | 6/2001 | Bijkerk | B82Y 10/00 |
| | | | | 250/492.2 |
| 2002/0001363 | A1 * | 1/2002 | Kondo | G03F 7/7055 |
| | | | | 378/119 |
| 2003/0201737 | A1 * | 10/2003 | Kleinschmidt | H05G 2/0027 |
| | | | | 315/219 |
| 2006/0006775 | A1 * | 1/2006 | Smith | H05G 2/007 |
| | | | | 313/46 |
| 2006/0243927 | A1 * | 11/2006 | Tran | G03F 7/70033 |
| | | | | 250/504 R |
| 2006/0273732 | A1 * | 12/2006 | Korobochko | H05G 2/002 |
| | | | | 315/111.21 |
| 2007/0098129 | A1 * | 5/2007 | Edwards | H05H 1/03 |
| | | | | 376/107 |
| 2008/0042591 | A1 * | 2/2008 | Smith | H01J 65/048 |
| | | | | 315/248 |
| 2008/0063132 | A1 * | 3/2008 | Birnbach | G21B 1/03 |
| | | | | 376/107 |
| 2008/0142740 | A1 * | 6/2008 | Ivanov | G03F 7/70033 |
| | | | | 250/493.1 |
| 2010/0215136 | A1 * | 8/2010 | Rusnak | H05H 1/06 |
| | | | | 376/108 |
| 2014/0023170 | A1 | 1/2014 | Slough | |
| 2015/0216028 | A1 | 7/2015 | Laberge et al. | |
| 2015/0302940 | A1 | 10/2015 | Raman | |
| 2018/0220519 | A1 * | 8/2018 | Grossnickle | H05H 1/06 |
| 2018/0342376 | A1 | 11/2018 | Hruska | |
| 2020/0058411 | A1 * | 2/2020 | Shumlak | H05H 1/06 |
| 2022/0394839 | A1 * | 12/2022 | Shumlak | G21B 1/21 |
| 2023/0238154 | A1 * | 7/2023 | Thompson | G21B 1/05 |
| | | | | 376/100 |
| 2023/0377762 | A1 * | 11/2023 | Stoltz | H01J 37/32064 |
| 2024/0161938 | A1 * | 5/2024 | Shumlak | H05H 1/04 |
| 2024/0212994 | A1 * | 6/2024 | Stoltz | H01J 37/32064 |
| 2024/0321469 | A1 * | 9/2024 | Parga | C22C 11/06 |

FOREIGN PATENT DOCUMENTS

| | | | |
|---|---|---|---|
| JP | H06-196298 A | 7/1994 | |
| JP | H08-179066 A | 7/1996 | |
| JP | 2004-504706 A | 2/2004 | |
| JP | 2004-226244 A | 8/2004 | |
| JP | 2005-527079 A | 9/2005 | |
| JP | 2012-517085 A | 7/2012 | |
| JP | 2018-124178 A | 8/2018 | |
| JP | 2020509539 A | 3/2020 | |
| WO | WO-2006131975 A1 * | 12/2006 | H05H 1/10 |

OTHER PUBLICATIONS

Nygren et al., "Liquid surfaces for fusion plasma components—A critical review. Part I: Physics and PSI", Nuclear Materials and Energy, 2016, vol. 9, 6-21.

Wong et al., "Evaluation of the tungsten alloy vaporizing lithium first wall and blanket concept.", Fusion Technology, 2001, vol. 39, 815-822.

Slutz et al., "Z-pinch driven fusion energy.", No. SAND2000-1342C. Sandia National Lab.(SNL-NM), 2000, 12 pages.

Mayberry et al., "Suppression of vacuum breakdown using thin-film coatings.", Journal of Applied Physics, 1994, 76(7), 4448-4450.

Extended European Search Report issued Feb. 13, 2023, in European Patent Application No. 22206270.5, 13 pages.

Shumlak et al., "Insulator Modifications to Increase Plasma Source Duration on the ZaP Flow Z-Pinch Fuse diagnostics View project Plasma Catalysis View project", Innovative Confinement Concepts Workshop, 2015, 1-17.

Blakely, J.M., "Automated Operation of the ZaP Flow Z-Pinch Experiment", 2008, 1-174, retrieved from the internet: https://citeseerx.ist.psu.edu/document ?repid=repl&type=pdf&doi=e9dd09f38b1837bla f77539f5a7al9482fd14a56.

Chan, B-J., "Four-chord Interferometer Measurements of the ZaP Flow Z-Pinch", 2008, 1-59, XP093020583, retrieved from the Internet: https://citeseerx.ist.psu.edu/document ?repid=repl&type=pdf&doi=e9dd09f38b1837blaf77539f5a7al9482fd14a56.

Knecht, Sean D., Weston Lowrie, and Uri Shumlak. "Effects of a conducting wall on Z-pinch stability." IEEE Transactions on Plasma Science 42.6 (2014): 1531-1543. (Year: 2014).

Ross, Michael Patrick. Exploring plasma stability and confinement with high resolution density measurements on the ZaP-HD Flow Z-Pinch. Diss. 2016. (Year: 2016).

Shumlak, Uri, et al. "Increasing plasma parameters using sheared flow stabilization of a Z-pinch." Physics of Plasmas 24.5 (2017). ( Year: 2017).

Nygren, Richard E. Plasma Facing Components. No. San D2011-0600P. Sandia National Lab.(SN L-N M), Albuquerque, NM (United States), 2011, "Liquid surfaces for fusion plasma facing components—A critical review. Part I: Physics and PSI", Nuclear Materials and Energy, 2016, 6-21.

Shumlak et al. , "High energy density Z-pinch plasmas using flow stabilization" , AIP Conference Proceedings , AIP Publishing, 2015, vol. 1639, pp. 76-79.

Office Action for Japanese Patent Application No. 2019-566613 mailed Apr. 27, 2022.

(56) References Cited

OTHER PUBLICATIONS

McLean, H.S., Shumlak, U., Nelson, B.A., Golingo, R., Claveau, E.L., Weber, T.R., Schmidt, A., Higginson, D.P., Tummel, K. "Development of a Compact Fusion Device based on the Flow Z-Pinch." 2016 ARPA-e Annual Review, Seattle, WA, Aug. 9-11, 2015.

Second Office Action Issued in Chinese Patent Application No. 2018800128444 dated Feb. 11, 2022.

Notification of Reasons for Refusal Issued in Japanese Patent Application No. 2019545269 dated Feb. 10, 2022.

Slutz, S. A. et al., "Pulsed-power-driven cylindrical liner implosions of laser preheated fuel magnetized with an axial field," Physics of Plasmas 17, 056303 (2010).

Spielman, R. B. et al., Wire-array z pinches as intense x-ray sources for inertial confinement fusion, Plasma Physics and Controlled Fusion 42, B 157 (2000).

Terry, P. W., "Suppression of turbulence and transport by sheared flow," Reviews of Modem Physics 72:1, 109 (2000).

Turchi, P. J. et al., "Generation of high-energy plasmas by electro-magnetic implosion," Journal of Applied Physics 44, 1936 (1973).

Written Opinion of the International Searching Authority for PCT/US2018/019364 dated Jul. 10, 2018, pp. 1-7.

The International Search Report {ISR) or PCT/US2018/019364 dated Jul. 10, 2018, pp. 1-3.

Golingo et al. "Formation of a sheared flow Z pinch" Physics of Plasmas (2005) vol. 12, pp. 1-21.

* cited by examiner

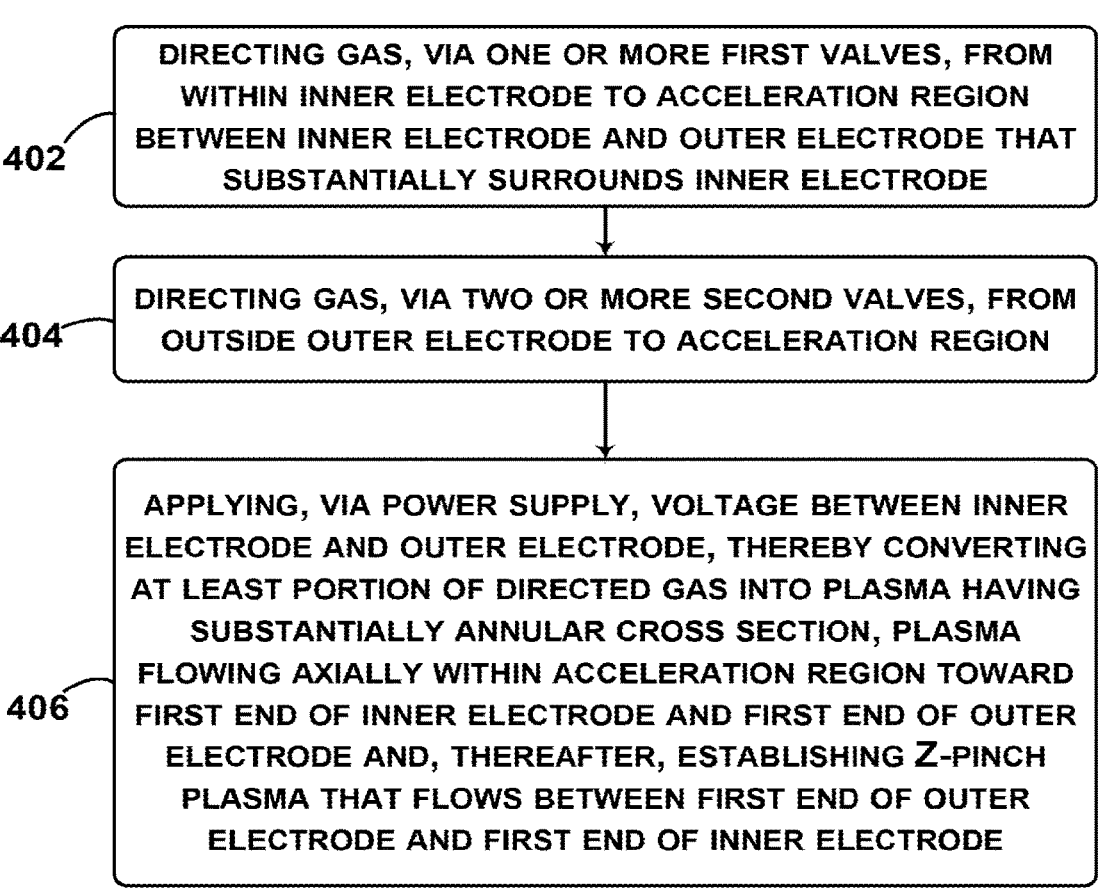

402 — DIRECTING GAS, VIA ONE OR MORE FIRST VALVES, FROM WITHIN INNER ELECTRODE TO ACCELERATION REGION BETWEEN INNER ELECTRODE AND OUTER ELECTRODE THAT SUBSTANTIALLY SURROUNDS INNER ELECTRODE

404 — DIRECTING GAS, VIA TWO OR MORE SECOND VALVES, FROM OUTSIDE OUTER ELECTRODE TO ACCELERATION REGION

406 — APPLYING, VIA POWER SUPPLY, VOLTAGE BETWEEN INNER ELECTRODE AND OUTER ELECTRODE, THEREBY CONVERTING AT LEAST PORTION OF DIRECTED GAS INTO PLASMA HAVING SUBSTANTIALLY ANNULAR CROSS SECTION, PLASMA FLOWING AXIALLY WITHIN ACCELERATION REGION TOWARD FIRST END OF INNER ELECTRODE AND FIRST END OF OUTER ELECTRODE AND, THEREAFTER, ESTABLISHING Z-PINCH PLASMA THAT FLOWS BETWEEN FIRST END OF OUTER ELECTRODE AND FIRST END OF INNER ELECTRODE

FIG. 4

PLASMA CONFINEMENT SYSTEM AND METHODS FOR USE

CROSS-REFERENCE TO RELATED APPLICATIONS

This application is a divisional of U.S. application Ser. No. 18/150,255, filed on Jan. 5, 2023, which is a divisional of U.S. application Ser. No. 16/487,338 filed on Aug. 20, 2019, which is a U.S. national phase application under 35 U.S.C. § 371 of international application PCT/US2018/019364 filed on Feb. 23, 2018, which claims the benefit of U.S. Provisional Patent Application No. 62/462,779 filed on Feb. 23, 2017, the contents of all of which are incorporated herein by reference in their entirety.

STATEMENT REGARDING FEDERALLY SPONSORED RESEARCH OR DEVELOPMENT

This invention was made with government support under Grant Nos. DE-AR0000571, DE-FG02-04ER54756, and DE-NA0001860, awarded by the Department of Energy [DOE]. The government has certain rights in the invention.

BACKGROUND

Unless otherwise indicated herein, the materials described in this section are not prior art to the claims in this application and are not admitted to be prior art by inclusion in this section.

Nuclear fusion is the process of combining two nuclei. When two nuclei of elements with atomic numbers less than that of iron are fused, energy is released. The release of energy is due to a slight difference in mass between the reactants and the products of the fusion reaction and is governed by $\Delta E = \Delta mc^2$. The release of energy is also dependent upon the attractive strong nuclear force between reactant nuclei overcoming the repulsive electrostatic force between the reactant nuclei.

The fusion reaction requiring the lowest plasma temperature occurs between deuterium (a hydrogen nucleus with one proton and one neutron) and tritium (a hydrogen nucleus having one proton and two neutrons). This reaction yields a helium-4 nucleus and a neutron.

One approach for achieving nuclear fusion is to energize a gas containing fusion reactants inside a reactor chamber. The energized gas becomes a plasma via ionization. To achieve conditions with sufficient temperatures and densities for fusion, the plasma needs to be confined.

SUMMARY

A first aspect of the disclosure is a plasma confinement system that includes an inner electrode, an outer electrode that substantially surrounds the inner electrode, one or more first valves configured to direct gas from within the inner electrode to an acceleration region between the inner electrode and the outer electrode, two or more second valves configured to direct gas from outside the outer electrode to the acceleration region, and a power supply configured to apply a voltage between the inner electrode and the outer electrode.

A second aspect of the disclosure is a method for operating a plasma confinement system. The method includes directing gas, via one or more first valves, from within an inner electrode to an acceleration region between the inner electrode and an outer electrode that substantially surrounds the inner electrode, directing gas, via two or more second valves, from outside the outer electrode to the acceleration region, and applying, via a power supply, a voltage between the inner electrode and the outer electrode, thereby converting at least a portion of the directed gas into a plasma having a substantially annular cross section, the plasma flowing axially within the acceleration region toward a first end of the inner electrode and a first end of the outer electrode and, thereafter, establishing a Z-pinch plasma that flows between the first end of the outer electrode and the first end of the inner electrode.

A third aspect of the disclosure is a plasma confinement system that includes an inner electrode, an intermediate electrode that substantially surrounds the inner electrode, an outer electrode that substantially surrounds the intermediate electrode, one or more first valves configured to direct gas from within the inner electrode to an acceleration region between the inner electrode and the intermediate electrode, two or more second valves configured to direct gas from outside the intermediate electrode to the acceleration region, a first power supply configured to apply a voltage between the inner electrode and the intermediate electrode, and a second power supply configured to apply a voltage between the inner electrode and the outer electrode.

A fourth aspect of the disclosure is a method for operating a plasma confinement system. The method includes directing gas, via one or more first valves, from within an inner electrode to an acceleration region between the inner electrode and an intermediate electrode that substantially surrounds the inner electrode, directing gas, via two or more second valves, from outside the intermediate electrode to the acceleration region, applying, via a first power supply, a voltage between the inner electrode and the intermediate electrode, thereby converting at least a portion of the directed gas into a plasma having a substantially annular cross section, the plasma flowing axially within the acceleration region toward a first end of the inner electrode and a first end of the outer electrode, and applying, via a second power supply, a voltage between the inner electrode and the outer electrode to establish a Z-pinch plasma that flows between the first end of the outer electrode and the first end of the inner electrode.

A fifth aspect of the disclosure is a plasma confinement system that includes an inner electrode, an outer electrode that substantially surrounds the inner electrode, an intermediate electrode that faces the inner electrode, one or more first valves configured to direct gas from within the inner electrode to an acceleration region between the inner electrode and the outer electrode, two or more second valves configured to direct gas from outside the outer electrode to the acceleration region, a first power supply configured to apply a voltage between the inner electrode and the outer electrode, and a second power supply configured to apply a voltage between the inner electrode and the intermediate electrode.

A sixth aspect of the disclosure is a method for operating a plasma confinement system. The method includes directing gas, via one or more first valves, from within an inner electrode to an acceleration region between the inner electrode and an outer electrode that substantially surrounds the inner electrode, directing gas, via two or more second valves, from outside the outer electrode to the acceleration region, applying, via a first power supply, a voltage between the inner electrode and the outer electrode, thereby converting at least a portion of the directed gas into a plasma having a substantially annular cross section, the plasma flowing axially within the acceleration region toward a first end of the inner electrode and a first end of the outer electrode, and applying, via a second power supply, a voltage between the inner electrode and an intermediate electrode to establish a Z-pinch plasma that flows between the intermediate electrode and the first end of the inner electrode, wherein the intermediate electrode is positioned at a first end of the outer electrode.

When the term "substantially" or "about" is used herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. In some examples disclosed herein, "substantially" or "about" means within +/−5% of the recited value.

These, as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible.

BRIEF DESCRIPTION OF THE DRAWINGS

FIG. 4 is a block diagram of a method for operating a plasma confinement system, according to an example embodiment.

DETAILED DESCRIPTION

Various embodiments of plasma confinement systems and methods for their use are disclosed herein. The disclosed embodiments, when compared to existing systems and methods, may facilitate increased plasma stability, more robust sheared plasma flow, smaller Z-pinch plasma radii, higher magnetic fields, and/or higher plasma temperature. Some of the disclosed embodiments exhibit independent control of plasma acceleration and plasma compression as well.

Figure 1:
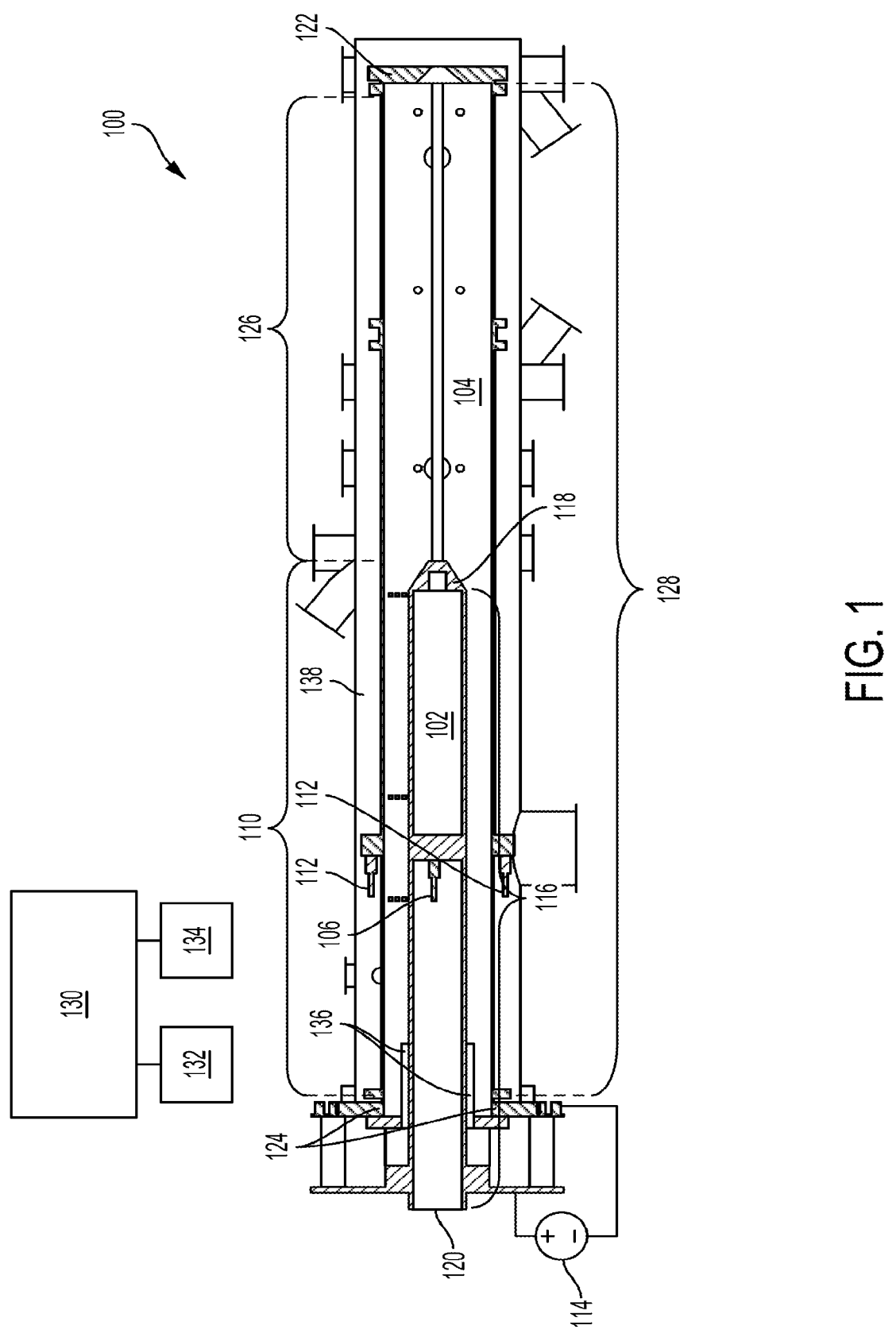
FIG. 1 is a schematic cross-sectional diagram of a plasma confinement system, according to an example embodiment.

FIG. 1 is a schematic cross-sectional diagram of a plasma confinement system 100. The plasma confinement system 100 includes an inner electrode 102 and an outer electrode 104 that substantially surrounds the inner electrode 102. The plasma confinement system 100 also includes one or more first valves 106 configured to direct gas from within the inner electrode 102 to an acceleration region 110 between the inner electrode 102 and the outer electrode 104 and two or more second valves 112 configured to direct gas from outside the outer electrode 104 to the acceleration region 110. The plasma confinement system 100 also includes a power supply 114 configured to apply a voltage between the inner electrode 102 and the outer electrode 104.

The inner electrode 102 generally takes the form of an electrically conducting (e.g., stainless steel) shell having a substantially cylindrical body 116. The inner electrode 102 includes a first end 118 (e.g. a rounded end) and an opposing second end 120 (e.g., a substantially circular end). More specifically, the first end 118 may have a conical shape with a rounded tip. The inner electrode 102 may include one or more conduits or channels (not shown) for routing gas from the one or more first valves 106 to the acceleration region 110.

The outer electrode 104 also generally takes the form of an electrically conducting (e.g., stainless steel) shell having a substantially cylindrical body 128. The outer electrode 104 includes a first end 122 (e.g., a substantially disc-shaped end) and an opposing second end 124 (e.g., a substantially circular end). As shown in FIG. 1, the first end 118 of the inner electrode 102 is between the first end 122 of the outer electrode 104 and the second end 124 of the outer electrode 104. The outer electrode 104 surrounds much of the inner electrode 102. The inner electrode 102 and the outer electrode 104 may be concentric and have radial symmetry with respect to the same axis. The outer electrode 104 may include one or more conduits or channels (not shown) for routing gas from the two or more second valves 112 to the acceleration region 110.

The one or more first valves 106 may take the form of "puff valves," but may include any type of valve configured to direct gas (e.g., hydrogen or deuterium) from within the inner electrode 102 to an acceleration region 110 between the inner electrode 102 and the outer electrode 104. As shown in FIG. 1, the one or more first valves 106 are positioned axially between the first end 118 of the inner electrode 102 and the second end 120 of the inner electrode 102. Alternatively, the one or more first valves might be located at the first end 118 or the second end 120 of the inner electrode 102. In FIG. 1, the one or more first valves 106 are positioned within the inner electrode 102, but other examples are possible. The one or more first valves 106 can be operated by providing the one or more first valves 106 with a control voltage, as described below.

The acceleration region 110 has a substantially annular cross section defined by the shapes of the inner electrode 102 and the outer electrode 104.

The two or more second valves 112 may take the form of "puff valves," but may include any type of valve configured to direct gas (e.g., hydrogen or deuterium) from outside the outer electrode 104 to the acceleration region 110. As shown in FIG. 1, the two or more second valves 112 are positioned axially between the first end 122 of the outer electrode 104 and the second end 124 of the outer electrode 104. Alternatively, the two or more second valves may be located at the second end 124 or at the first end 122. The two or more second valves 112 will generally be arranged around the outer electrode 104. As shown in FIG. 1, the one or more first valves 106 are axially aligned with the two or more second valves 112, but other examples are possible. The two or more first valves 112 can be operated by providing the two or more second valves 112 with a control voltage, as described below.

The power supply 114 will generally take the form of a capacitor bank capable of storing up to 500 kJ or up to 3-4

MJ, for example. A positive terminal of the power supply 114 can be coupled to the inner electrode 102 or alternatively to the outer electrode 104.

The plasma confinement system 100 includes an assembly region 126 within the outer electrode 104 between the first end 118 of the inner electrode 102 and the first end 122 of the outer electrode 104. The plasma confinement system 100 is configured to sustain a Z-pinch plasma within the assembly region 126 as described below.

The plasma confinement system 100 also includes a gas source 130 (e.g., a pressurized gas tank) and one or more first regulators 132 configured to control gas flow from the gas source 130 through the respective one or more first valves 106. Connections (e.g., piping) between the one or more first regulators 132 and the one or more first valves 106 are omitted in FIG. 1 for clarity.

The plasma confinement system 100 also includes two or more second regulators 134 configured to control gas flow from the gas source 130 through the respective two or more second valves 112. Connections (e.g., piping) between the one or more second regulators 134 and the two or more second valves 112 are omitted in FIG. 1 for clarity.

The plasma confinement system 100 also includes an insulator 136 between the second end 124 of the outer electrode 104 and the inner electrode 102 to maintain electrical isolation between the inner electrode 102 and the outer electrode 104. The insulator 136 (e.g., a ceramic material) generally has an annular cross section.

The plasma confinement system also includes a vacuum chamber 138 (e.g., a stainless steel vessel) that at least partially surrounds the inner electrode 102 and the outer electrode 104, as shown in FIG. 1.

Figure 2:
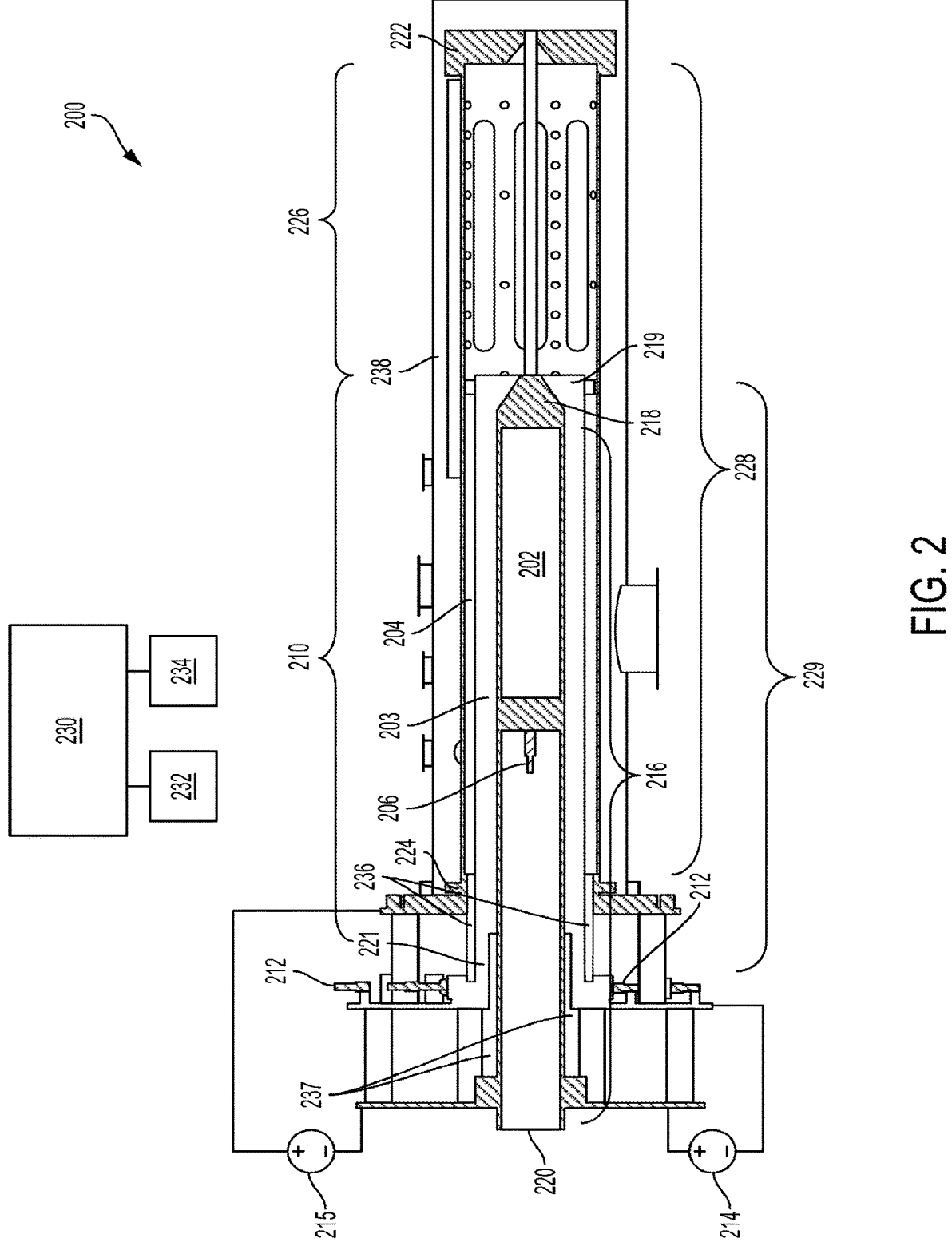
FIG. 2 is a schematic cross-sectional diagram of a plasma confinement system, according to an example embodiment.

FIG. 2 is a schematic cross-sectional diagram of a plasma confinement system 200. The plasma confinement system 200 includes an inner electrode 202, an intermediate electrode 203 that substantially surrounds the inner electrode 202, and an outer electrode 204 that substantially surrounds the intermediate electrode 203. The plasma confinement system 200 also includes one or more first valves 206 configured to direct gas from within the inner electrode 202 to an acceleration region 210 between the inner electrode 202 and the intermediate electrode 203. The plasma confinement system 200 also includes two or more second valves 212 configured to direct gas from outside the intermediate electrode 203 to the acceleration region 210. The plasma confinement system 200 also includes a first power supply 214 configured to apply a voltage between the inner electrode 202 and the intermediate electrode 203 and a second power supply 215 configured to apply a voltage between the inner electrode 202 and the outer electrode 204.

The inner electrode 202 generally takes the form of an electrically conducting (e.g., stainless steel) shell having a substantially cylindrical body 216. The inner electrode 202 includes a first end 218 (e.g. a rounded end) and an opposing second end 220 (e.g., a substantially circular end). More specifically, the first end 218 may have a conical shape with a rounded tip. The inner electrode 202 is generally similar to the inner electrode 102 discussed above. The inner electrode 202 may include one or more conduits or channels (not shown) for routing gas from the one or more first valves 206 to the acceleration region 210.

The outer electrode 204 also generally takes the form of an electrically conducting (e.g., stainless steel) shell having a substantially cylindrical body 228. The first end 222 of the outer electrode 204 is substantially disc-shaped and the second end 224 of the outer electrode is substantially circular. The outer electrode 204 surrounds much of the inner electrode 202 and much of the intermediate electrode 203. The inner electrode 202, the intermediate electrode 203, and the outer electrode 204 may be concentric and have radial symmetry with respect to the same axis.

The intermediate electrode 203 generally takes the form of an electrically conducting (e.g., stainless steel) having a substantially cylindrical body 229. The intermediate electrode 203 includes a first end 219 that is substantially circular and a second opposing end 221 that is substantially circular. The intermediate electrode 203 may include one or more conduits or channels (not shown) for routing gas from the two or more second valves 212 to the acceleration region 210.

The first end 218 of the inner electrode 202 is between the first end 222 of the outer electrode 204 and the second end 224 of the outer electrode 204. The first end 219 of the intermediate electrode 203 is between the first end 222 of the outer electrode 204 and the second end 224 of the outer electrode 204.

The one or more first valves 206 may take the form of "puff valves," but may include any type of valve configured to direct gas (e.g., hydrogen or deuterium) from within the inner electrode 202 to an acceleration region 210 between the inner electrode 202 and the intermediate electrode 203. As shown in FIG. 2, the one or more first valves 206 are positioned axially between the first end 218 of the inner electrode 202 and the second end 220 of the inner electrode 202. Alternatively, the one or more first valves might be located at the first end 218 or the second end 220 of the inner electrode 202. In FIG. 2, the one or more first valves 206 are positioned within the inner electrode 202, but other examples are possible. The one or more first valves 206 can be operated by providing the one or more first valves 206 with a control voltage, as described below.

The acceleration region 210 has a substantially annular cross section defined by the shapes of the inner electrode 202 and the intermediate electrode 203.

The two or more second valves 212 may take the form of "puff valves," but may include any type of valve configured to direct gas (e.g., hydrogen or deuterium) from outside the intermediate electrode 203 to the acceleration region 210. As shown in FIG. 2, the two or more second valves 212 are positioned at the second end 221 of the intermediate electrode 203, but other examples are possible. The two or more second valves 212 are arranged outside of the outer electrode 204 and outside of the intermediate electrode 203, for example. In other examples, the two or more second valves could be located inside the outer electrode and outside the intermediate electrode. The two or more second valves 212 are configured to direct gas between the first insulator 236 and the second insulator 237. The two or more first valves 212 can be operated by providing the two or more second valves 212 with a control voltage, as described below.

The first power supply 214 and the second power supply 215 will generally take the form of respective capacitor banks capable of storing up to 100-200 kJ or 3-4 MJ, for example.

The plasma confinement system 200 includes an assembly region 226 within the outer electrode 204 between the first end 218 of the inner electrode 202 and the first end 222 of the outer electrode 204. The plasma confinement system 200 is configured to sustain a Z-pinch plasma within the assembly region 226 as described below.

The plasma confinement system 200 also includes a gas source 230 (e.g., a pressurized gas tank) and one or more first regulators 232 configured to control gas flow from the gas source 230 through the respective one or more first valves 206. Connections (e.g., piping) between the one or more first regulators 232 and the one or more first valves 206 are omitted in FIG. 2 for clarity.

The plasma confinement system 200 also includes two or more second regulators 234 configured to control gas flow from the gas source 230 through the respective two or more second valves 212. Connections (e.g., piping) between the two or more second regulators 234 and the two or more second valves 212 are omitted in FIG. 2 for clarity.

The plasma confinement system 200 also includes a first insulator 236 between the second end 224 of the outer electrode 204 and the intermediate electrode 203. The first insulator 236 generally has an annular cross section.

The plasma confinement system 200 also includes a second insulator 237 between the second end 221 of the intermediate electrode 203 and the inner electrode 202. The second insulator 237 generally has an annular cross section.

The plasma confinement system 200 also includes a vacuum chamber 238 (e.g., a steel vessel) that at least partially surrounds the inner electrode 202, the intermediate electrode 203, and the outer electrode 204, as shown in FIG. 2.

Figure 3:
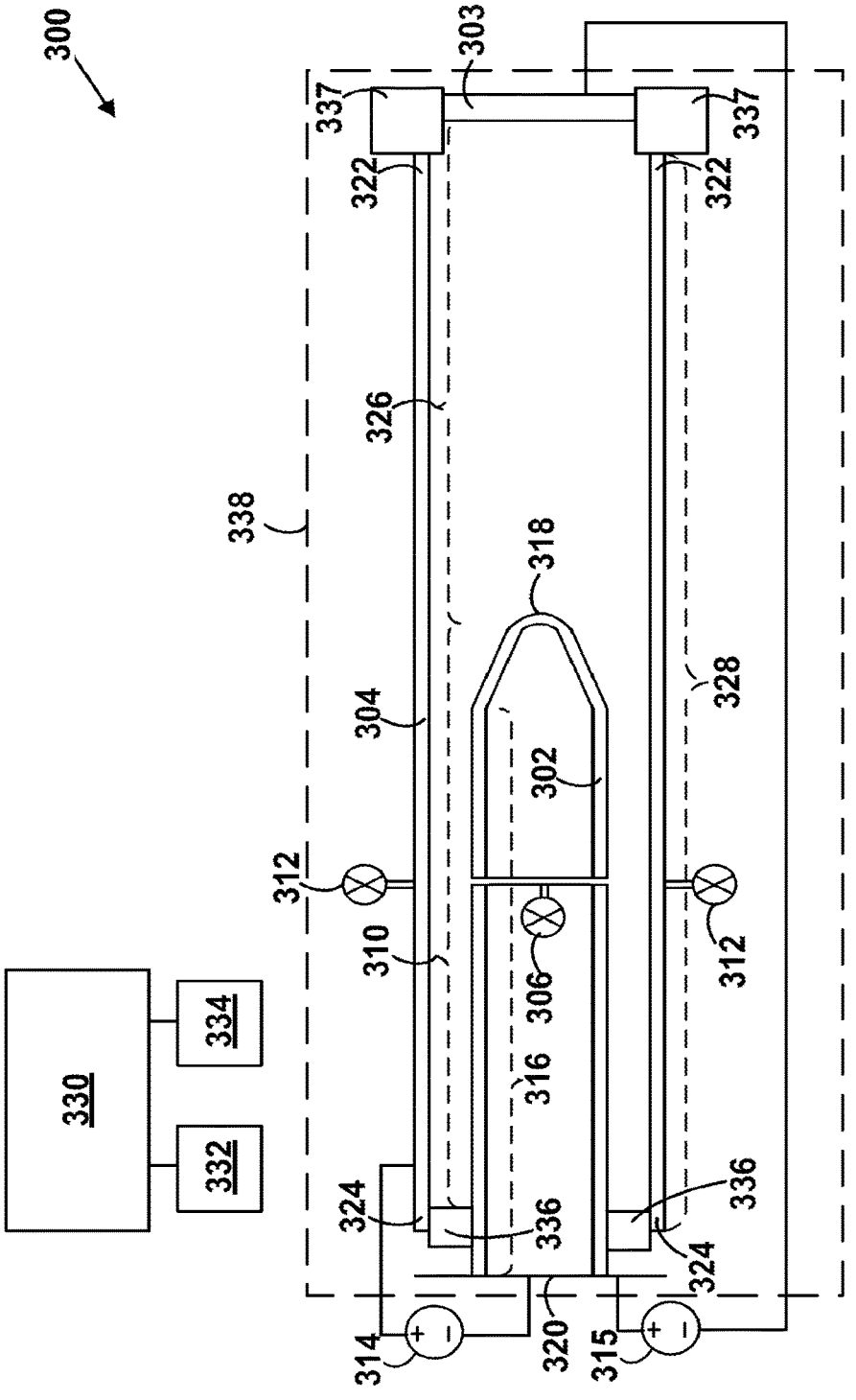
FIG. 3 is a schematic cross-sectional diagram of a plasma confinement system, according to an example embodiment.

FIG. 3 is a schematic cross-sectional diagram of a plasma confinement system 300. The plasma confinement system 300 includes an inner electrode 302, an outer electrode 304 that substantially surrounds the inner electrode 302, and an intermediate electrode 303 that faces the inner electrode 302. The plasma confinement system 300 also includes one or more first valves 306 configured to direct gas from within the inner electrode 302 to an acceleration region 310 between the inner electrode 302 and the outer electrode 304 and two or more second valves 312 configured to direct gas from outside the outer electrode 304 to the acceleration region 310. The plasma confinement system 300 also includes a first power supply 314 configured to apply a voltage between the inner electrode 302 and the outer electrode 304 and a second power supply 315 configured to apply a voltage between the inner electrode 302 and the intermediate electrode 303.

The inner electrode 302 generally takes the form of an electrically conducting (e.g., stainless steel) shell having a substantially cylindrical body 316. The inner electrode 302 includes a first end 318 (e.g. a rounded end) and an opposing second end 320 (e.g., a substantially circular end). More specifically, the first end 318 may have a conical shape with a rounded tip. The inner electrode 302 is generally similar to the inner electrode 102 and the inner electrode 202 discussed above. The inner electrode 302 may include one or more conduits or channels (not labeled) for routing gas from the one or more first valves 306 to the acceleration region 310.

The outer electrode 304 also generally takes the form of an electrically conducting (e.g., stainless steel) shell having a substantially cylindrical body 328. The first end 322 of the outer electrode 304 is substantially circular and the second end 324 of the outer electrode is substantially circular. The outer electrode 304 surrounds much of the inner electrode 302. The inner electrode 302 and the outer electrode 304 may be concentric and have radial symmetry with respect to the same axis. The first end 318 of the inner electrode 302 is between the first end 322 of the outer electrode 304 and the second end 324 of the outer electrode 304. The outer electrode 304 may include one or more conduits or channels (not shown) for routing gas from the two or more second valves 312 to the acceleration region 310.

The intermediate electrode 303 also generally takes the form of an electrically conducting material (e.g., stainless steel) and is substantially disc-shaped.

The one or more first valves 306 may take the form of "puff valves," but may include any type of valve configured to direct gas (e.g., hydrogen or deuterium) from within the inner electrode 302 to an acceleration region 310 between the inner electrode 302 and the outer electrode 304. As shown in FIG. 3, the one or more first valves 306 are positioned axially between the first end 318 of the inner electrode 302 and the second end 320 of the inner electrode 302. Alternatively, the one or more first valves might be located at the first end 318 or the second end 320 of the inner electrode 302. In FIG. 3, the one or more first valves 306 are positioned within the inner electrode 302, but other examples are possible. The one or more first valves 306 can be operated by providing the one or more first valves 306 with a control voltage, as described below.

The acceleration region 310 has a substantially annular cross section defined by the shapes of the inner electrode 302 and the outer electrode 304.

The two or more second valves 312 may take the form of "puff valves," but may include any type of valve configured to direct gas (e.g., hydrogen or deuterium) from outside the outer electrode 304 to the acceleration region 310. As shown in FIG. 3, the two or more second valves 312 are positioned axially between the first end 322 of the outer electrode 304 and the second end 324 of the outer electrode 304. Alternatively, the two or more second valves may be located at the second end 324 or at the first end 322. The two or more second valves 312 will generally be arranged around (e.g., outside of) the outer electrode 304. As shown in FIG. 3, the one or more first valves 306 are axially aligned with the two or more second valves 312, but other examples are possible. The two or more second valves 312 can be operated by providing the two or more second valves 312 with a control voltage, as described below.

The first power supply 314 and the second power supply 315 will generally take the form of respective capacitor banks capable of storing up to 100-200 kJ or 3-4 MJ, for example.

The plasma confinement system 300 includes an assembly region 326 within the outer electrode 304 between the first end 318 of the inner electrode 302 and the intermediate electrode 303. The plasma confinement system 300 is configured to sustain a Z-pinch plasma within the assembly region 326 as described below.

The plasma confinement system 300 also includes a gas source 330 (e.g., a pressurized gas tank) and one or more first regulators 332 configured to control gas flow from the gas source 330 through the respective one or more first valves 306. Connections (e.g., piping) between the one or more first regulators 332 and the one or more first valves 306 are omitted in FIG. 3 for clarity.

The plasma confinement system 300 also includes two or more second regulators 334 configured to control gas flow from the gas source 330 through the respective two or more second valves 312. Connections (e.g., piping) between the one or more second regulators 334 and the two or more second valves 312 are omitted in FIG. 3 for clarity.

The plasma confinement system 300 also includes a first insulator 336 (e.g., having an annular cross section) between the outer electrode 304 and the inner electrode 302 to maintain electrical isolation between the inner electrode 302 and the outer electrode 304.

The plasma confinement system 300 also includes a second insulator 337 (e.g., having an annular cross section) between the second end 322 of the outer electrode 304 and the intermediate electrode 303 to maintain electrical isolation between the intermediate electrode 303 and the outer electrode 304.

The plasma confinement system 300 also includes a vacuum chamber 338 that at least partially surrounds the inner electrode 302, the intermediate electrode 303, and/or the outer electrode 304.

FIG. 4 is a block diagram of a method 400 for operating a plasma confinement system (e.g., the plasma confinement system 100). FIGS. 1, 5A-F, 6, and 7 viewed together illustrate some of the aspects of the method 400 as described below. FIGS. 5A-F include simplified diagrams of portions of the plasma confinement system 100 as well as depict functionality of the plasma confinement system 100.

At block 402, the method 400 includes directing gas, via one or more first valves, from within an inner electrode to an acceleration region between the inner electrode and an outer electrode that substantially surrounds the inner electrode.

Figures 5A, 5B, 5C, 5D, 5E, 5F:
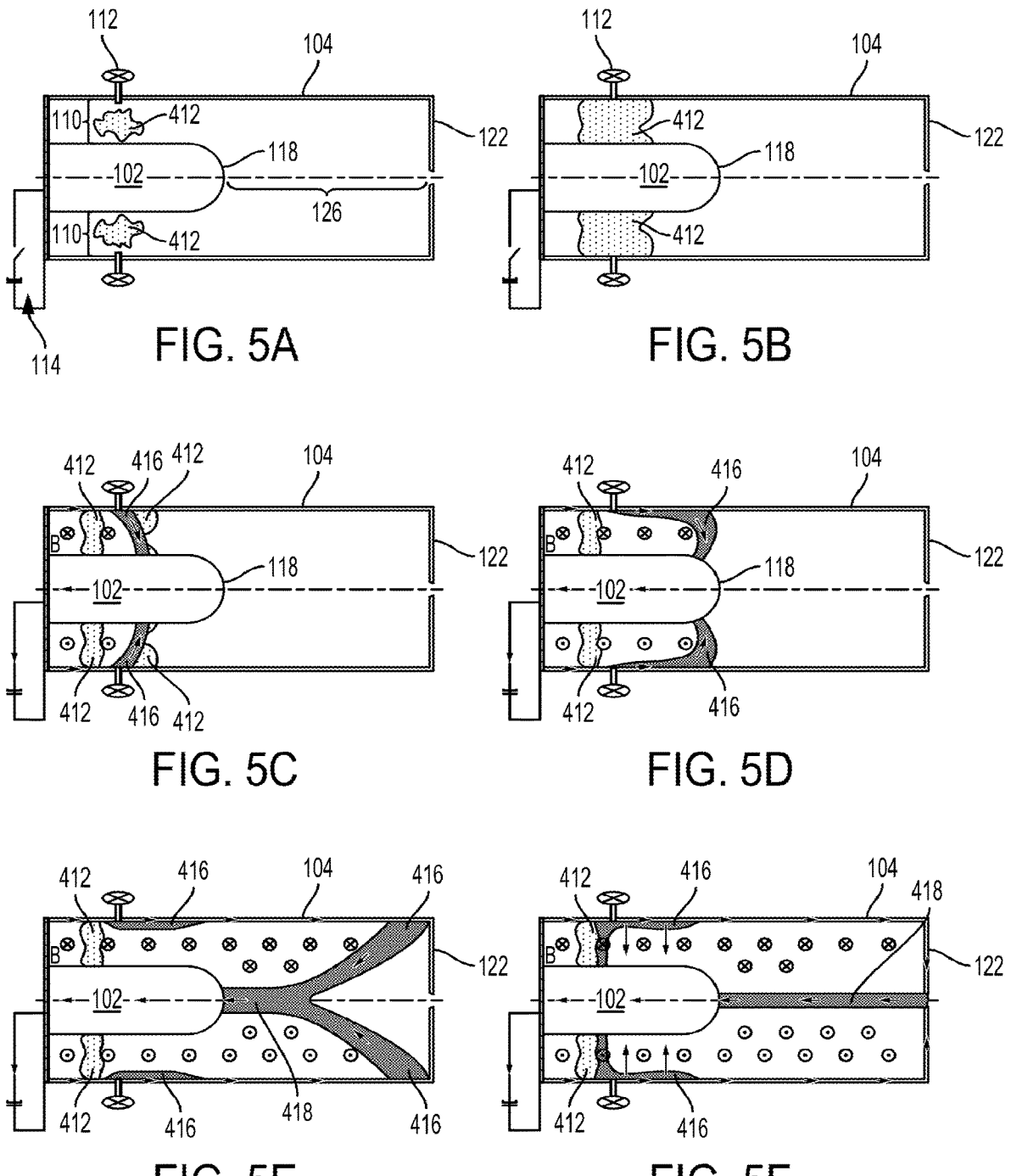
FIG. 5A illustrates some aspects of a plasma confinement system and a method for operation, according to an example embodiment.
FIG. 5B illustrates some aspects of a plasma confinement system and a method for operation, according to an example embodiment.
FIG. 5C illustrates some aspects of a plasma confinement system and a method for operation, according to an example embodiment.
FIG. 5D illustrates some aspects of a plasma confinement system and a method for operation, according to an example embodiment.
FIG. 5E illustrates some aspects of a plasma confinement system and a method for operation, according to an example embodiment.
FIG. 5F illustrates some aspects of a plasma confinement system and a method for operation, according to an example embodiment.

For example, the one or more first valves 106 may direct gas 412 (see FIGS. 5A-B), from within the inner electrode 102 to the acceleration region 110 between the inner electrode 102 and the outer electrode 104 that substantially surrounds the inner electrode 102. FIG. 5A shows an initial amount of the gas 412 entering the acceleration region 110 and FIG. 5B shows an additional amount of the gas 412 entering the acceleration region 110.

Figure 6:
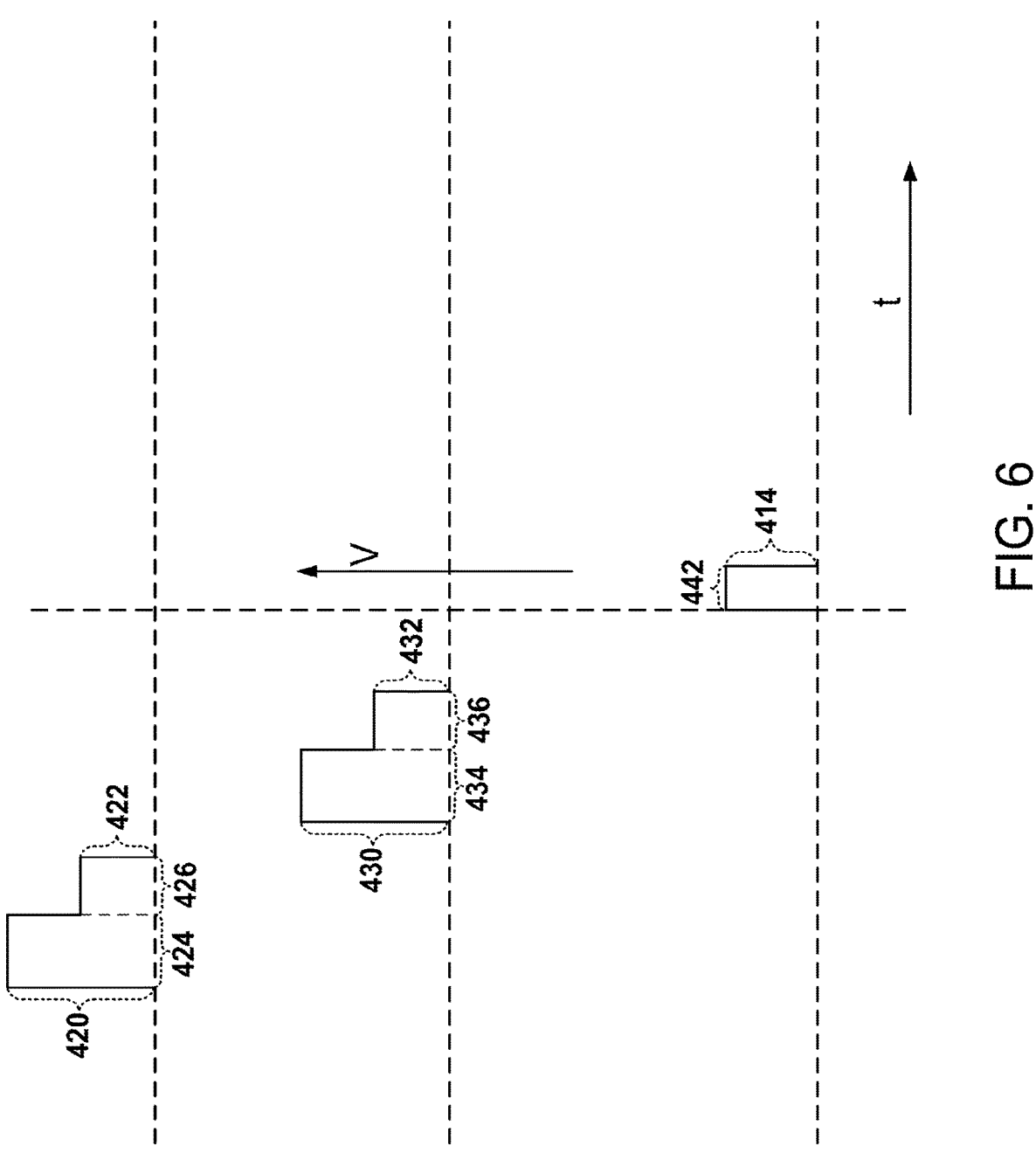
FIG. 6 illustrates voltage waveforms related to a method for operating a plasma confinement system, according to an example embodiment.
Figure 7:
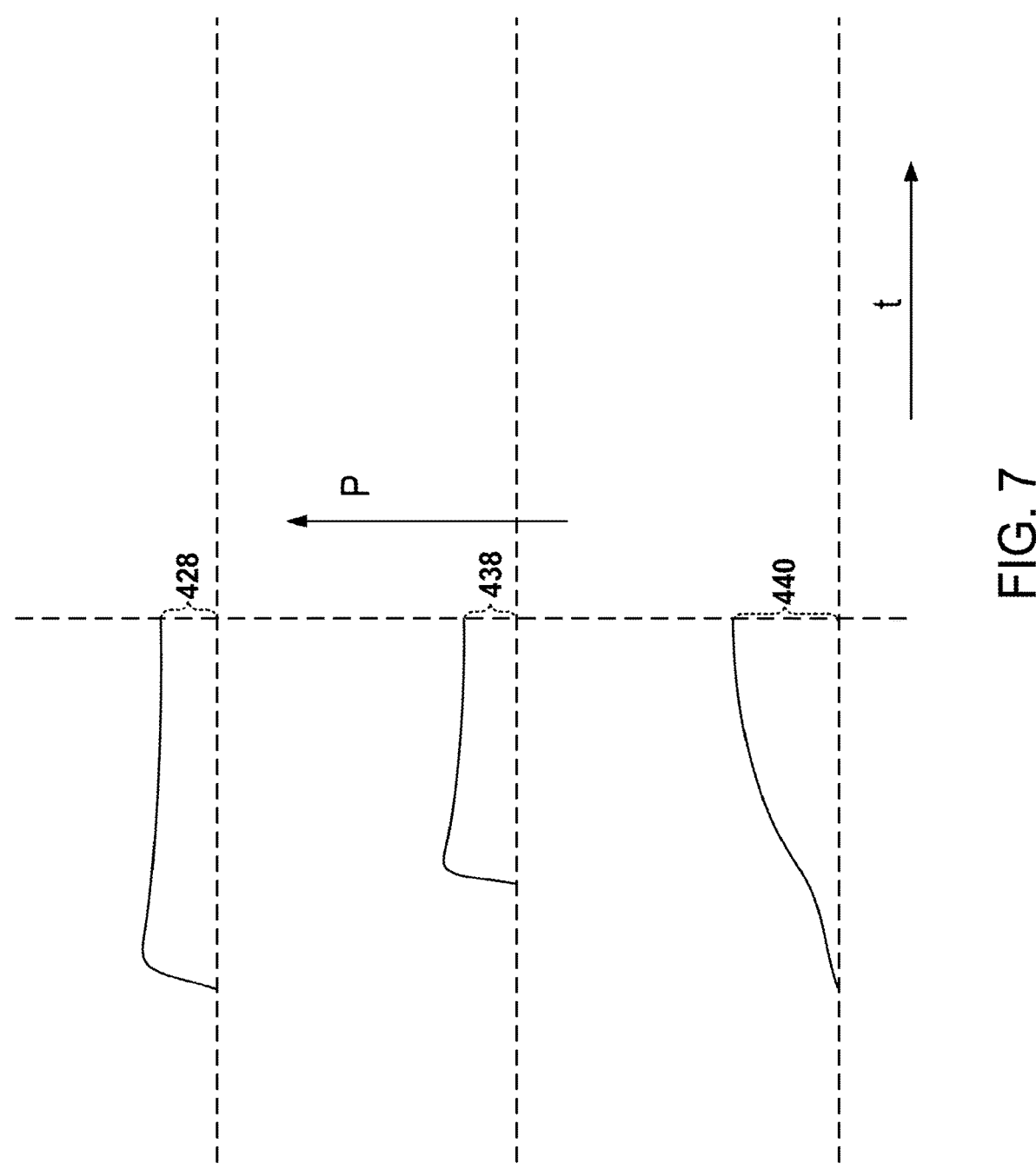
FIG. 7 illustrates gas pressure profiles related to a method for operating a plasma confinement system, according to an example embodiment.

FIG. 6 depicts some other possible features of the method 400. Voltages, waveforms, and times depicted in FIG. 6 are not necessarily shown to scale. In some embodiments, directing the gas 412 via the one or more first valves 106 includes providing (via a power supply such as a capacitor bank that is not shown) a first valve voltage 420 to the one or more first valves 106 (e.g., to control terminals of the one or more first valves 106) followed by providing a second valve voltage 422 (e.g., via a DC power supply) to the one or more first valves 106.

In this context, the first valve voltage 420 is generally within a range of 270 to 330 volts, within a range of 290 to 310 volts, or within a range of 295 to 305 volts. Voltages recited herein are generally DC voltages unless otherwise specified. The first valve voltage 420 may be provided for a duration 424 within a range of 90 to 110 µs, within a range of 95 to 105 µs, or within a range of 98 to 102 µs. It should be noted that the respective waveforms of the first valve voltage 420 and the second valve voltage 422 in practice will not take the form of square waves, but will generally have a smoother waveform and transition between the first valve voltage 420 and the second valve voltage 422 characteristic of an RLC circuit.

The second valve voltage 422 might be within a range of 13.5 to 16.5 volts, within a range of 14 to 16 volts, or within a range of 14.5 to 15.5 volts. For example, the second valve voltage 422 might be provided for a duration 426 within a range of 0.5 to 5 ms, within a range of 0.65 to 3.5 ms, or within a range of 0.75 to 2 ms. Typically the first valve voltage 420 is greater than the second valve voltage 422 and the second valve voltage 422 is provided immediately after providing the first valve voltage 420.

After operation of the one or more first valves 106, a gas pressure 428 (see FIG. 7) adjacent to the one or more first valves 106 might be within a range of 1000 to 5800 Torr (e.g., 5450 to 5550 Torr) prior to the voltage 414 (see FIG. 6) between the inner electrode 102 and the outer electrode 104 being applied via the power supply 114.

Directing the gas 412 via the one or more first valves 106 might include opening the one or more first valves 106 for a duration within a range of 1.1 to 2 milliseconds (ms) or within a range of 1.3 to 1.5 ms. Additionally, directing the gas 412 via the one or more first valves 106 might include opening the one or more first valves 106 1.0 to 1.6 ms or 1.3 to 1.5 ms prior to applying the voltage 414 between the inner electrode 102 and the outer electrode 104 via the power supply 114.

At block 404, the method 400 includes directing gas, via two or more second valves, from outside the outer electrode to the acceleration region. For example, the two or more second valves 112 may direct a portion of the gas 412 into the acceleration region 110 as shown in FIGS. 5A-B.

In some embodiments, directing the gas 412 via the two or more second valves 112 includes providing (via a power supply such as a capacitor bank that is not shown) a third valve voltage 430 (see FIG. 6) to the two or more second valves 112 (e.g., to control terminals of the two or more second valves 112) followed by providing a fourth valve voltage 432 (e.g., via a DC power supply) to the two or more second valves 112.

In this context, the third valve voltage 430 is generally within a range of 270 to 330 volts, within a range of 290 to 310 volts, or within a range of 295 to 305 volts. The third valve voltage 430 might be provided for a duration 434 within a range of 90 to 110 μs, within a range of 95 to 105 μs, or within a range of 98 to 102 μs. It should be noted that the respective waveforms of the third valve voltage 430 and the fourth valve voltage 432 in practice will not take the form of square waves, but will generally have a smoother waveform and transition between the third valve voltage 430 and the fourth valve voltage 432 characteristic of an RLC circuit.

The fourth valve voltage 432 is generally within a range of 13.5 to 16.5 volts, within a range of 14 to 16 volts, or within a range of 14.5 to 15.5 volts. The fourth valve voltage 432 might be provided for a duration 436 within a range of 0.5 to 5 ms, within a range of 0.65 to 3.5 ms, or within a range of 0.75 to 2 ms. The third valve voltage 430 is typically greater than the fourth valve voltage 432. The fourth valve voltage 432 is generally provided immediately after providing the third valve voltage 430.

After operation of the two or more second valves 112, a gas pressure 438 (see FIG. 7) adjacent to the two or more second valves 112 might be within a range of 1000 to 5800 Torr (e.g., 5450 to 5550 Torr) prior to the voltage 414 between the inner electrode 102 and the outer electrode 104 being applied via the power supply 114.

Directing the gas 412 via the two or more second valves 112 might include opening the two or more second valves 112 for a duration within a range of 0.75 to 1 milliseconds (ms) or within a range of 0.8 to 0.95 ms.

Additionally, directing the gas 412 via the two or more second valves 112 might include opening the two or more second valves 112 0.6 to 1.2 ms or 0.7 to 0.9 ms prior to applying the voltage 414 between the inner electrode 102 and the outer electrode 104 via the power supply 114.

After operation of the one or more first valves 106 and the two or more second valves 112, a gas pressure 440 (see FIG. 7) within the acceleration region 110 might be within a range of 1000 to 5800 Torr (e.g., 5450 to 5550 Torr) prior to the voltage 414 between the inner electrode 102 and the outer electrode 104 being applied via the power supply 114. The gas pressure within the acceleration region will generally decrease with increasing distance from the point of gas insertion and with the passage of time after gas is no longer introduced to the acceleration region.

At block 406, the method 400 includes applying, via a power supply, a voltage between the inner electrode and the outer electrode, thereby converting at least a portion of the directed gas into a plasma having a substantially annular cross section, the plasma flowing axially within the acceleration region toward a first end of the inner electrode and a first end of the outer electrode and, thereafter, establishing a Z-pinch plasma that flows between the first end of the outer electrode and the first end of the inner electrode.

For example, the power supply 114 might apply the voltage 414 between the inner electrode 102 and the outer electrode 104, thereby converting at least a portion of the directed gas 412 into a plasma 416 (see FIGS. 5C-D) having a substantially annular cross section. Due to the magnetic field generated by its own current, the plasma 416 may flow axially within the acceleration region 110 toward the first end 118 of the inner electrode 102 and the first end 122 of the outer electrode 104 as shown in FIGS. 5C-D. When the plasma 416 moves beyond the acceleration region 110, a Z-pinch plasma 418 (see FIGS. 5E-F) is established and flows between the first end 122 of the outer electrode 104 and the first end 118 of the inner electrode 102.

The Z-pinch plasma 418 generally flows in the assembly region 126 within the outer electrode 104 between the first end 118 of the inner electrode 102 and the first end 122 of the outer electrode 104.

The voltage 414 applied by the power supply 114 between the inner electrode 102 and the outer electrode 104 might be within a range of 2 kV to 30 kV. The voltage 414 might be applied for a duration 442 (see FIG. 6) within a range of 50 to 400 μs.

The voltage 414 applied between the inner electrode 102 and the outer electrode 104 might result in a radial electric field within the acceleration region 110 within a range of 30 kV/Min to 500 kV/Mn.

The Z-pinch plasma 418 may exhibit sheared axial flow and have a radius between 0.1 mm and 5 mm, an ion temperature between 900 and 2000 eV, an electron temperature greater than 500 eV, an ion number density greater than $1 \times 10^{23}$ ions/m$^3$ or an electron number density of greater than $1 \times 10^{23}$ electrons/m$^3$, a magnetic field over 8 T, and/or may be stable for at least 10 μs.

Figure 8:
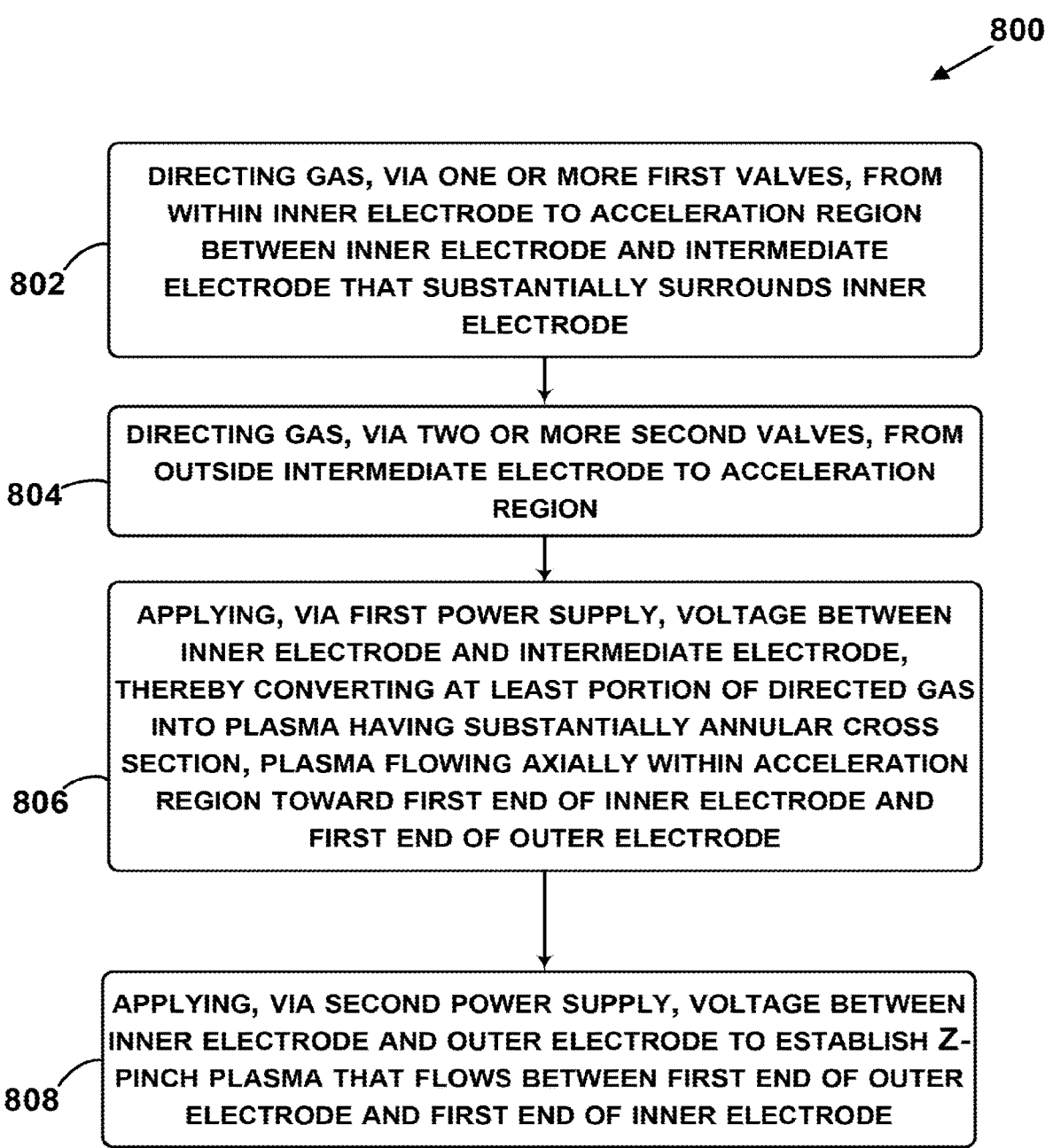
FIG. 8 is a block diagram of a method for operating a plasma confinement system, according to an example embodiment.

FIG. 8 is a block diagram of a method 800 for operating a plasma confinement system (e.g., the plasma confinement system 200). FIGS. 2, 9A-F, 10, and 11 viewed together illustrate some of the aspects of the method 800 as described below. FIGS. 9A-F include simplified diagrams of portions of the plasma confinement system 200 as well as depict functionality of the plasma confinement system 200.

At block 802, the method 800 includes directing gas, via one or more first valves, from within an inner electrode to an acceleration region between the inner electrode and an intermediate electrode that substantially surrounds the inner electrode.

Figures 9A, 9B, 9C, 9D, 9E, 9F:
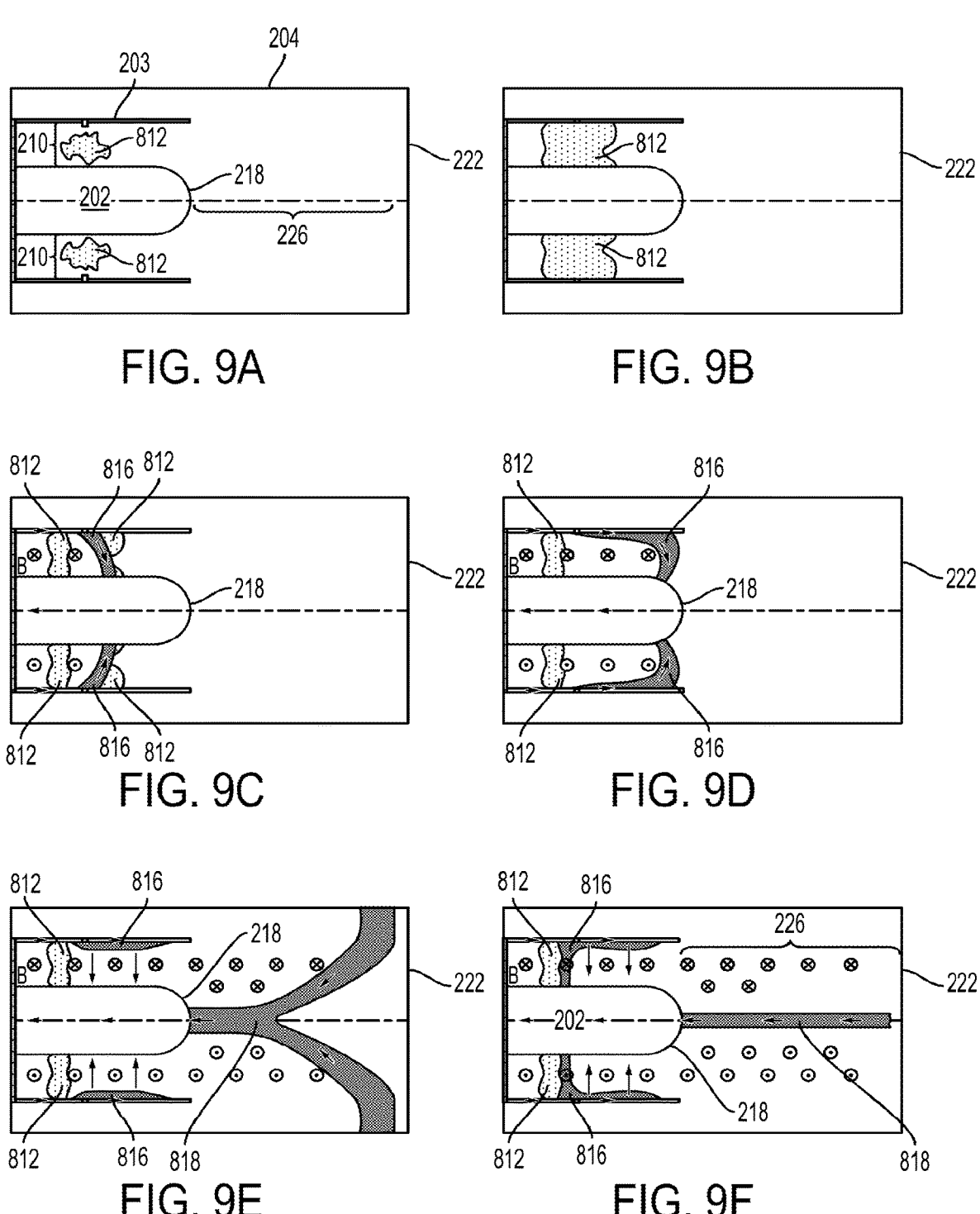
FIG. 9A illustrates some aspects of a plasma confinement system and a method for operation, according to an example embodiment.
FIG. 9B illustrates some aspects of a plasma confinement system and a method for operation, according to an example embodiment.
FIG. 9C illustrates some aspects of a plasma confinement system and a method for operation, according to an example embodiment.
FIG. 9D illustrates some aspects of a plasma confinement system and a method for operation, according to an example embodiment.
FIG. 9E illustrates some aspects of a plasma confinement system and a method for operation, according to an example embodiment.
FIG. 9F illustrates some aspects of a plasma confinement system and a method for operation, according to an example embodiment.

For example, the one or more first valves 206 may direct gas 812 from within the inner electrode 202 to an acceleration region 210 between the inner electrode 202 and the intermediate electrode 203 that substantially surrounds the inner electrode 202. FIG. 9A shows an initial amount of the gas 812 entering the acceleration region 210 and FIG. 9B shows an additional amount of the gas 812 entering the acceleration region 210.

Figure 10:
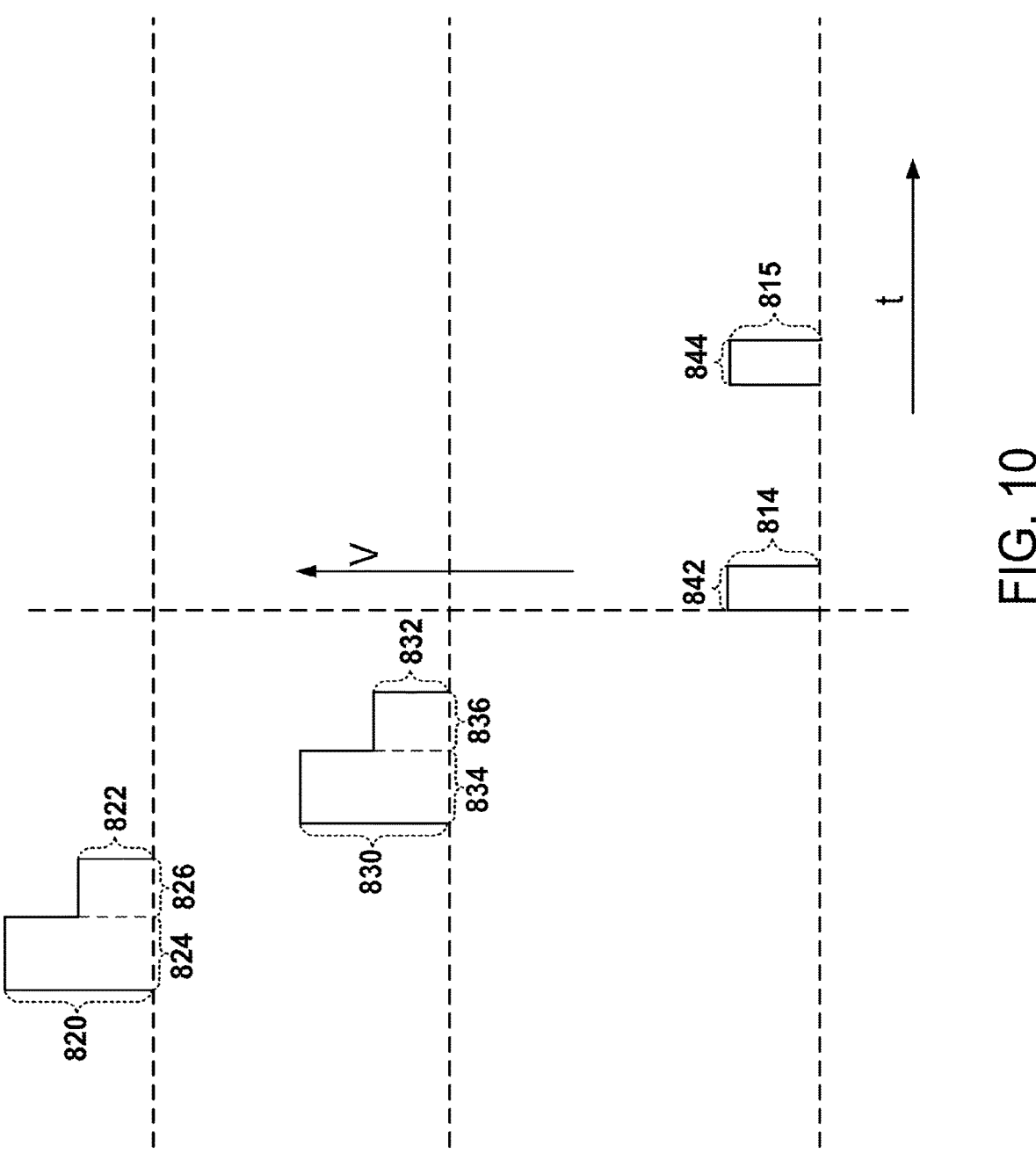
FIG. 10 illustrates voltage waveforms related to a method for operating a plasma confinement system, according to an example embodiment.
Figure 11:
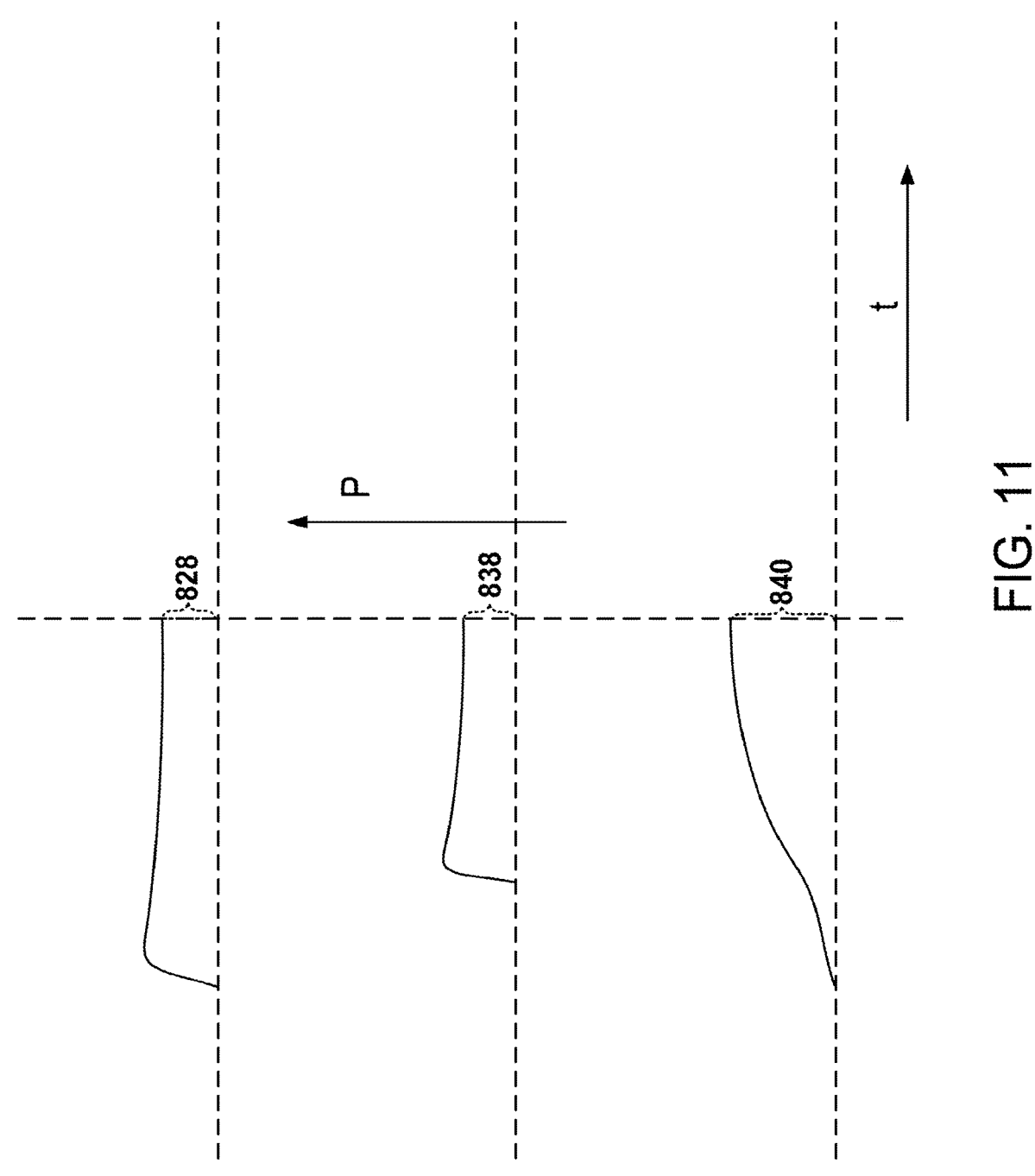
FIG. 11 illustrates gas pressure profiles related to a method for operating a plasma confinement system, according to an example embodiment.

FIG. 10 depicts some other possible features of the method 800. Voltages, waveforms, and times depicted in FIG. 10 are not necessarily shown to scale. In some embodiments, directing the gas 812 via the one or more first valves 206 includes providing (via a power supply such as a capacitor bank that is not shown) a first valve voltage 820 to the one or more first valves 206 (e.g., to control terminals of the one or more first valves 206) followed by providing a second valve voltage 822 (e.g., via a DC power supply) to the one or more first valves 206.

In this context, the first valve voltage 820 is generally within a range of 270 to 330 volts, within a range of 290 to 310 volts, or within a range of 295 to 305 volts. Voltages recited herein are DC voltages unless otherwise specified. The first valve voltage 820 may be provided for a duration 824 within a range of 90 to 110 μs, within a range of 95 to 105 μs, or within a range of 98 to 102 μs. It should be noted that the respective waveforms of the first valve voltage 820 and the second valve voltage 822 in practice will not take the form of square waves, but will generally have a smoother waveform and transition between the first valve voltage 820 and the second valve voltage 822 characteristic of an RLC circuit.

The second valve voltage 822 might be within a range of 13.5 to 16.5 volts, within a range of 14 to 16 volts, or within a range of 14.5 to 15.5 volts. For example, the second valve voltage 822 might be provided for a duration 826 within a range of 0.5 to 5 ms, within a range of 0.65 to 3.5 ms, or within a range of 0.75 to 2 ms. Typically the first valve voltage 820 is greater than the second valve voltage 822 and the second valve voltage 822 is provided immediately after providing the first valve voltage 820.

After operation of the one or more first valves 206, a gas pressure 828 (see FIG. 11) adjacent to the one or more first valves 206 might be within a range of 1000 to 5800 Torr (e.g., 5450 to 5550 Torr) prior to the voltage 814 (see FIG. 10) between the inner electrode 202 and the intermediate electrode 203 being applied via the power supply 214.

Directing the gas 812 via the one or more first valves 206 might include opening the one or more first valves 206 for a duration within a range of 1.1 to 2 milliseconds (ms) or within a range of 1.3 to 1.5 ms. Additionally, directing the gas 812 via the one or more first valves 206 might include opening the one or more first valves 206 1.0 to 1.6 ms or 1.3 to 1.5 ms prior to applying the voltage 814 between the inner electrode 202 and the intermediate electrode 203 via the power supply 214.

At block 804, the method 800 includes directing gas, via two or more second valves, from outside the intermediate electrode to the acceleration region. For example, the two or more second valves 212 may direct a portion of the gas 812 into the acceleration region 210 as shown in FIGS. 9A-B.

In some embodiments, directing the gas 812 via the two or more second valves 212 includes providing (via a power supply such as a capacitor bank that is not shown) a third valve voltage 830 to the two or more second valves 212 (e.g., to control terminals of the two or more second valves 212) followed by providing a fourth valve voltage 832 (e.g., via a DC power supply) to the two or more second valves 212.

In this context, the third valve voltage 830 is generally within a range of 270 to 330 volts, within a range of 290 to 310 volts, or within a range of 295 to 305 volts. The third valve voltage 830 might be provided for a duration 834 within a range of 90 to 110 μs, within a range of 95 to 105 μs, or within a range of 98 to 102 μs. It should be noted that the respective waveforms of the third valve voltage 830 and the fourth valve voltage 832 in practice will not take the form of square waves, but will generally have a smoother waveform and transition between the third valve voltage 830 and the fourth valve voltage 832 characteristic of an RLC circuit.

The fourth valve voltage 832 is generally within a range of 13.5 to 16.5 volts, within a range of 14 to 16 volts, or within a range of 14.5 to 15.5 volts. The fourth valve voltage 832 might be provided for a duration 836 within a range of 0.5 to 5 ms, within a range of 0.65 to 3.5 ms, or within a range of 0.75 to 2 ms. The third valve voltage 830 is typically greater than the fourth valve voltage 832. The fourth valve voltage 832 is generally provided immediately after providing the third valve voltage 830.

After operation of the two or more second valves 212, a gas pressure 838 (see FIG. 11) adjacent to the two or more second valves 212 might be within a range of 1000 to 5800 Torr (e.g., 5450 to 5550 Torr) prior to the voltage 814 between the inner electrode 202 and the intermediate electrode 203 being applied via the power supply 214.

Directing the gas 812 via the two or more second valves 212 might include opening the two or more second valves 212 for a duration within a range of 0.75 to 1 milliseconds (ms) or within a range of 0.8 to 0.95 ms.

Additionally, directing the gas 812 via the two or more second valves 212 might include opening the two or more second valves 212 0.6 to 1.2 ms or 0.7 to 0.9 ms prior to applying the voltage 814 between the inner electrode 202 and the intermediate electrode 203 via the power supply 214.

After operation of the one or more first valves 206 and the two or more second valves 212, a gas pressure 840 (see FIG. 11) within the acceleration region 210 might be within a range of 1000 to 5800 Torr (e.g., 5450 to 5550 Torr) prior to the voltage 814 between the inner electrode 102 and the intermediate electrode 203 being applied via the power supply 214. The gas pressure within the acceleration region will generally decrease with increasing distance from the point of gas insertion and with the passage of time after gas is no longer introduced to the acceleration region.

At block 806, the method 800 includes applying, via a first power supply, a voltage between the inner electrode and the intermediate electrode, thereby converting at least a portion of the directed gas into a plasma having a substantially annular cross section, the plasma flowing axially within the acceleration region toward a first end of the inner electrode and a first end of the outer electrode.

For example, the first power supply 214 may apply the voltage 814 (see FIG. 10) between the inner electrode 202 and the intermediate electrode 203, thereby converting at least a portion of the directed gas 812 into a plasma 816 (see FIGS. 9C-D) having a substantially annular cross section. Due to the magnetic field generated by its own current, the plasma 816 may flow axially within the acceleration region 210 toward the first end 218 of the inner electrode 202 and the first end 222 of the outer electrode 204 as shown in FIGS. 9C-D.

The voltage 814 applied by the power supply 214 between the inner electrode 202 and the intermediate electrode 203 might be within a range of 2 kV to 30 kV. The voltage 814 might be applied for a duration 842 (see FIG. 10) within a range of 50 to 400 μs.

The voltage 814 applied between the inner electrode 202 and the intermediate electrode 203 might result in a radial electric field within the acceleration region 210 within a range of 30 kV/m to 500 kV/m.

At block 808, the method 800 includes applying, via a second power supply, a voltage between the inner electrode and the outer electrode to establish a Z-pinch plasma that flows between the first end of the outer electrode and the first end of the inner electrode.

For example, the second power supply 215 might apply a voltage 815 (see FIG. 10) between the inner electrode 202 and the outer electrode 204 to establish a Z-pinch plasma 818 (see FIGS. 9E-F) that flows between the first end 222 of the outer electrode 204 and the first end 218 of the inner electrode 202. When the plasma 816 moves beyond the acceleration region 210, the Z-pinch plasma 818 is established in the assembly region 226 within the outer electrode 204 between the first end 218 of the inner electrode 202 and the first end 222 of the outer electrode 204.

It should be noted that blocks 806 and 808 might also be implemented by other means of controlling (a) the voltage between the inner electrode 202 and the intermediate electrode 203 and (b) the voltage between the intermediate electrode 203 and the outer electrode 204, as one of skill in the art will recognize. For example, a power supply might provide a voltage between the intermediate electrode 203 and the outer electrode 204, instead of between the inner electrode and the outer electrode.

Applying the voltage between the inner electrode 202 and the outer electrode 204 might include commencing applying the voltage between the inner electrode 202 and the outer electrode 204 17-27 µs or 19-22 µs after commencing applying the voltage between the inner electrode 202 and the intermediate electrode 203.

The voltage 815 applied by the power supply 215 between the inner electrode 202 and the outer electrode 204 is generally within a range of 2 kV to 30 kV. The voltage 815 might be applied for a duration 844 within a range of 50-400 µs.

The Z-pinch plasma 818 may exhibit sheared axial flow and have a radius between 0.1 mm and 5 mm, an ion temperature between 900 and 2000 eV, an electron temperature greater than 500 eV, an ion number density greater than $1\times10^{23}$ ions/m$^3$ or an electron number density of greater than $1\times10^{23}$ electrons/m$^3$, a magnetic field over 8 T, and/or may be stable for at least 10 µs.

Figure 12:
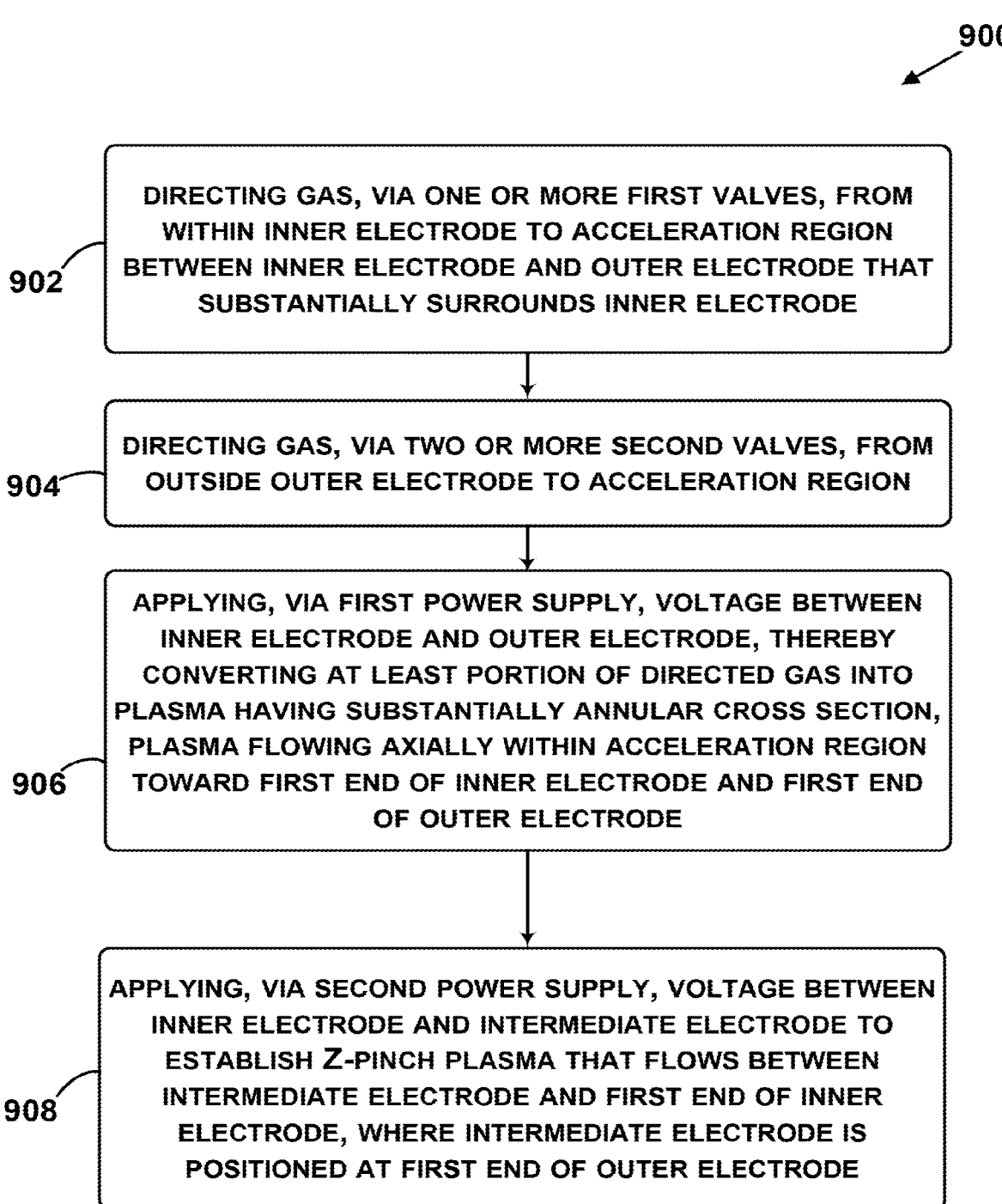
FIG. 12 is a block diagram of a method for operating a plasma confinement system, according to an example embodiment.

FIG. 12 is a block diagram of a method 900 for operating a plasma confinement system (e.g., the plasma confinement system 300). FIGS. 3, 13A-F, 14, and 15 viewed together illustrate some of the aspects of the method 900 as described below. FIGS. 13A-F include simplified diagrams of portions of the plasma confinement system 300 as well as depict functionality of the plasma confinement system 300.

At block 902, the method 900 includes directing gas, via one or more first valves, from within an inner electrode to an acceleration region between the inner electrode and an outer electrode that substantially surrounds the inner electrode.

Figures 13A, 13B, 13C, 13D, 13E, 13F:
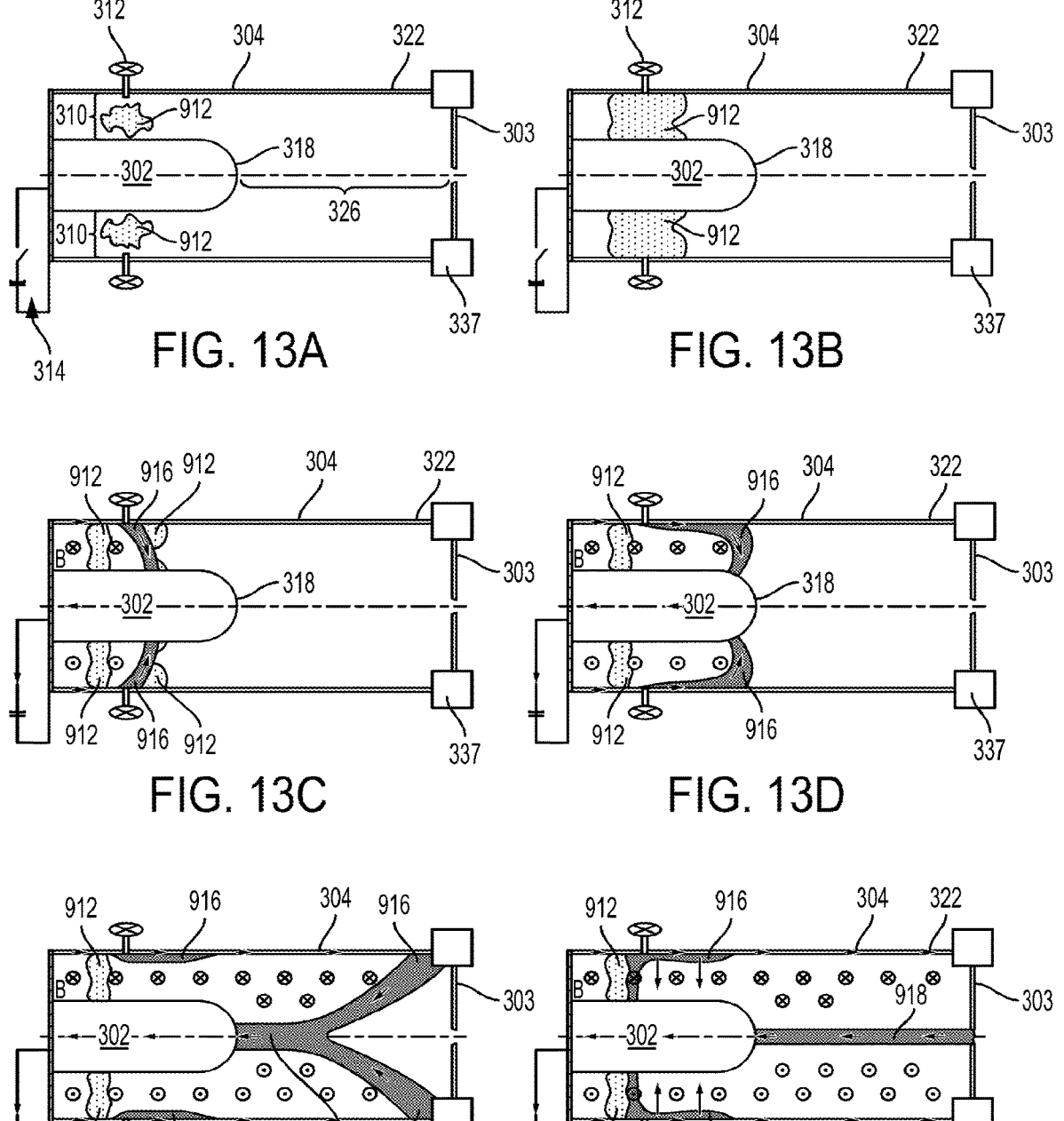
FIG. 13A illustrates some aspects of a plasma confinement system and a method for operation, according to an example embodiment.
FIG. 13B illustrates some aspects of a plasma confinement system and a method for operation, according to an example embodiment.
FIG. 13C illustrates some aspects of a plasma confinement system and a method for operation, according to an example embodiment.
FIG. 13D illustrates some aspects of a plasma confinement system and a method for operation, according to an example embodiment.
FIG. 13E illustrates some aspects of a plasma confinement system and a method for operation, according to an example embodiment.
FIG. 13F illustrates some aspects of a plasma confinement system and a method for operation, according to an example embodiment.

For example, the one or more first valves 306 may direct gas 912 (see FIGS. 13A-B), from within the inner electrode 302 to the acceleration region 310 between the inner electrode 302 and the outer electrode 304 that substantially surrounds the inner electrode 302. FIG. 13A shows an initial amount of the gas 912 entering the acceleration region 310 and FIG. 13B shows an additional amount of the gas 912 entering the acceleration region 310.

Figure 14:
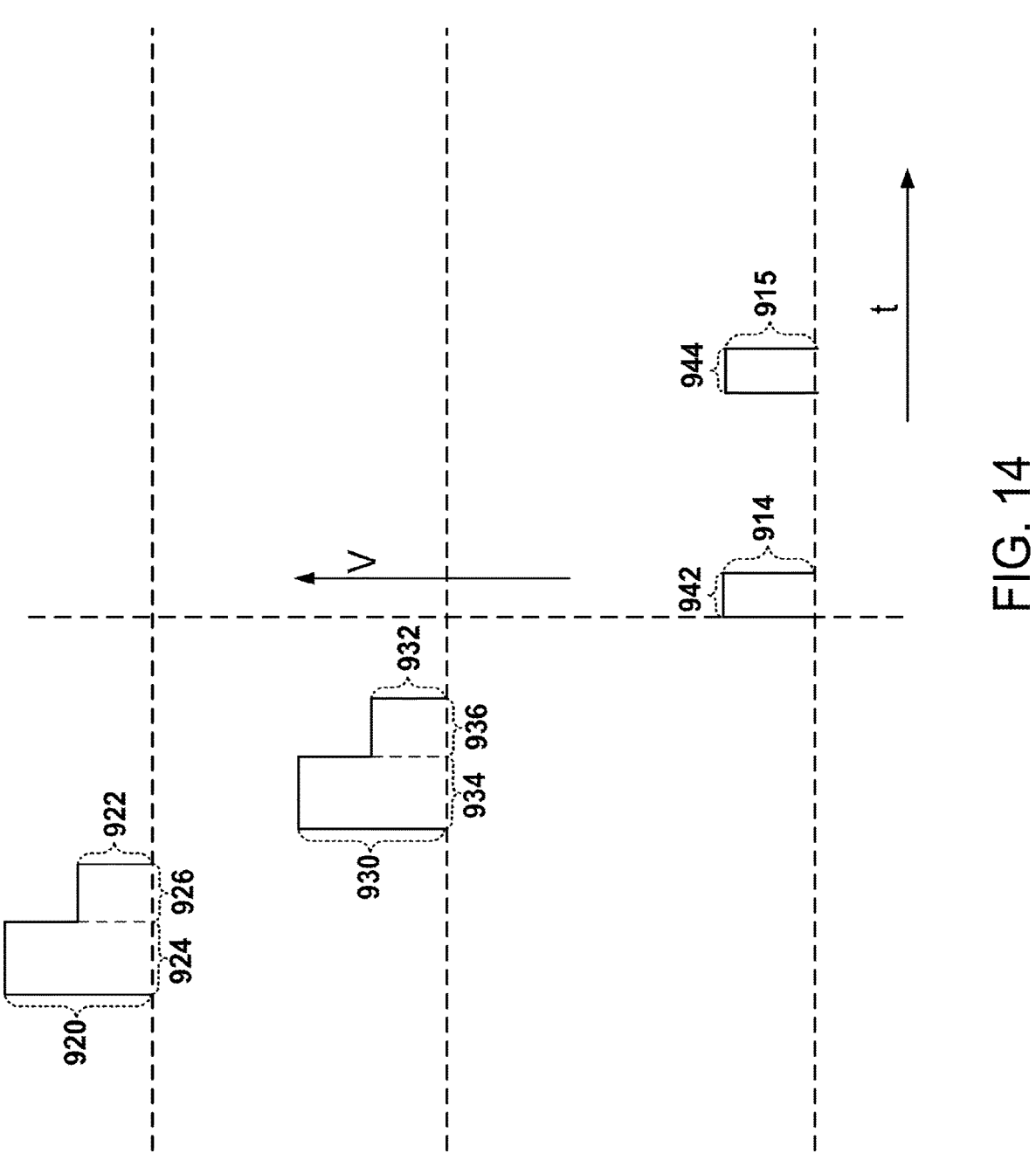
FIG. 14 illustrates voltage waveforms related to a method for operating a plasma confinement system, according to an example embodiment.
Figure 15:
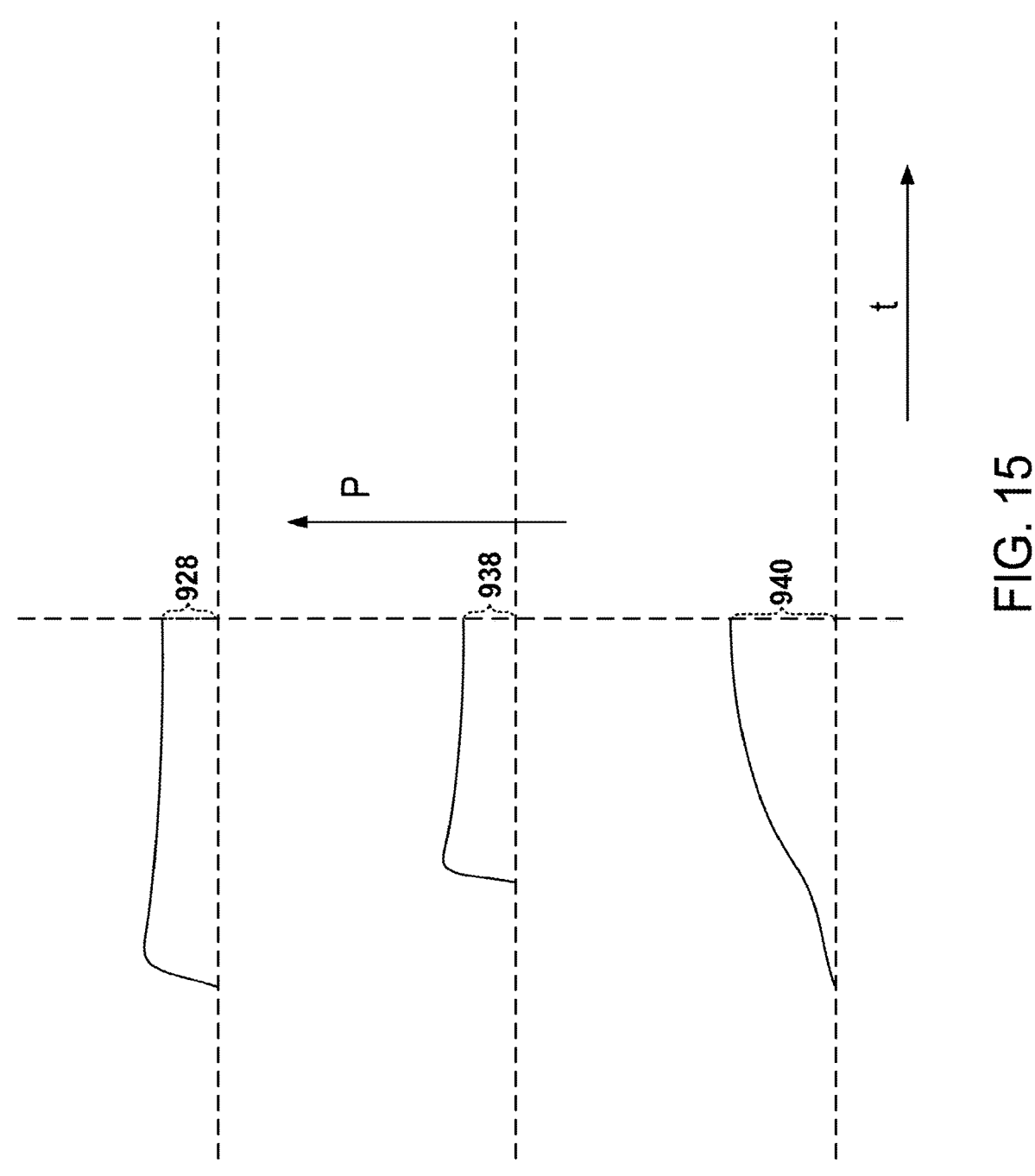
FIG. 15 illustrates gas pressure profiles related to a method for operating a plasma confinement system, according to an example embodiment.

FIG. 14 depicts some other possible features of the method 900. Voltages, waveforms, and times depicted in FIG. 14 are not necessarily shown to scale. In some embodiments, directing the gas 912 via the one or more first valves 306 includes providing (via a power supply such as a capacitor bank that is not shown) a first valve voltage 920 to the one or more first valves 306 (e.g., to control terminals of the one or more first valves 306) followed by providing a second valve voltage 922 (e.g., via a DC power supply) to the one or more first valves 306.

In this context, the first valve voltage 920 is generally within a range of 270 to 330 volts, within a range of 290 to 310 volts, or within a range of 295 to 305 volts. Voltages recited herein are generally DC voltages unless otherwise specified. The first valve voltage 920 may be provided for a duration 924 within a range of 90 to 110 µs, within a range of 95 to 105 µs, or within a range of 98 to 102 µs. It should be noted that the respective waveforms of the first valve voltage 920 and the second valve voltage 922 in practice will not take the form of square waves, but will generally have a smoother waveform and transition between the first valve voltage 920 and the second valve voltage 922 characteristic of an RLC circuit.

The second valve voltage 922 might be within a range of 13.5 to 16.5 volts, within a range of 14 to 16 volts, or within a range of 14.5 to 15.5 volts. For example, the second valve voltage 922 might be provided for a duration 926 within a range of 0.5 to 5 ms, within a range of 0.65 to 3.5 ms, or within a range of 0.75 to 2 ms. Typically the first valve voltage 920 is greater than the second valve voltage 922 and the second valve voltage 922 is provided immediately after providing the first valve voltage 920.

After operation of the one or more first valves 306, a gas pressure 928 (see FIG. 15) adjacent to the one or more first valves 306 might be within a range of 1000 to 5800 Torr (e.g., 5450 to 5550 Torr) prior to the voltage 914 (see FIG. 14) between the inner electrode 302 and the outer electrode 304 being applied via the power supply 314.

Directing the gas 912 via the one or more first valves 306 might include opening the one or more first valves 306 for a duration within a range of 1.1 to 2 milliseconds (ms) or within a range of 1.3 to 1.5 ms. Additionally, directing the gas 912 via the one or more first valves 306 might include opening the one or more first valves 306 1.0 to 1.6 ms or 1.3 to 1.5 ms prior to applying the voltage 914 between the inner electrode 302 and the outer electrode 304 via the power supply 314.

At block 904, the method 900 includes directing gas, via two or more second valves, from outside the outer electrode to the acceleration region. For example, the two or more second valves 312 may direct a portion of the gas 912 into the acceleration region 310 as shown in FIGS. 13A-B.

In some embodiments, directing the gas 912 via the two or more second valves 312 includes providing (via a power supply such as a capacitor that is not shown) a third valve voltage 930 (see FIG. 14) to the two or more second valves 312 (e.g., to control terminals of the two or more second valves 312) followed by providing a fourth valve voltage 932 (e.g., via a DC power supply) to the two or more second valves 312.

In this context, the third valve voltage 930 is generally within a range of 270 to 330 volts, within a range of 290 to 310 volts, or within a range of 295 to 305 volts. The third valve voltage 930 might be provided for a duration 934 within a range of 90 to 110 µs, within a range of 95 to 105 µs, or within a range of 98 to 102 µs. It should be noted that the respective waveforms of the third valve voltage 930 and the fourth valve voltage 932 in practice will not take the form of square waves, but will generally have a smoother waveform and transition between the third valve voltage 930 and the fourth valve voltage 932 characteristic of an RLC circuit.

The fourth valve voltage 932 is generally within a range of 13.5 to 16.5 volts, within a range of 14 to 16 volts, or within a range of 14.5 to 15.5 volts. The fourth valve voltage 932 might be provided for a duration 936 within a range of 0.5 to 5 ms, within a range of 0.65 to 3.5 ms, or within a range of 0.75 to 2 ms. The third valve voltage 930 is typically greater than the fourth valve voltage 932. The fourth valve voltage 932 is generally provided immediately after providing the third valve voltage 930.

After operation of the two or more second valves 312, a gas pressure 938 (see FIG. 15) adjacent to the two or more second valves 312 might be within a range of 1000 to 5800 Torr (e.g., 5450 to 5550 Torr) prior to the voltage 914 between the inner electrode 302 and the outer electrode 304 being applied via the power supply 314.

Directing the gas 912 via the two or more second valves 312 might include opening the two or more second valves 312 for a duration within a range of 0.75 to 1 milliseconds (ms) or within a range of 0.8 to 0.95 ms.

Additionally, directing the gas 912 via the two or more second valves 312 might include opening the two or more second valves 312 0.6 to 1.2 ms or 0.7 to 0.9 ms prior to applying the voltage 914 between the inner electrode 302 and the outer electrode 304 via the power supply 314.

After operation of the one or more first valves 306 and the two or more second valves 312, a gas pressure 940 (see FIG. 15) within the acceleration region 310 might be within a range of 1000 to 5800 Torr (e.g., 5450 to 5550 Torr) prior to the voltage 914 between the inner electrode 302 and the outer electrode 304 being applied via the power supply 314. The gas pressure within the acceleration region will generally decrease with increasing distance from the point of gas insertion and with the passage of time after gas is no longer introduced to the acceleration region.

At block 906, the method 900 includes applying, via a first power supply, a voltage between the inner electrode and the outer electrode, thereby converting at least a portion of the directed gas into a plasma having a substantially annular cross section, the plasma flowing axially within the acceleration region toward a first end of the inner electrode and a first end of the outer electrode.

For example, the power supply 314 might apply the voltage 914 between the inner electrode 302 and the outer electrode 304, thereby converting at least a portion of the directed gas 912 into a plasma 916 (see FIGS. 13C-D) having a substantially annular cross section. Due to the magnetic field generated by its own current, the plasma 916 may flow axially within the acceleration region 310 toward the first end 318 of the inner electrode 302 and the first end 322 of the outer electrode 304 as shown in FIGS. 13C-D.

The voltage 914 applied by the power supply 314 between the inner electrode 302 and the outer electrode 304 might be within a range of 2 kV to 30 kV. The voltage 914 might be applied for a duration 942 (see FIG. 14) within a range of 50 to 400 μs.

The voltage 914 applied between the inner electrode 302 and the outer electrode 304 might result in a radial electric field within the acceleration region 310 within a range of 30 kV/m to 500 kV/m.

At block 908, the method 900 includes applying, via a second power supply, a voltage between the inner electrode and an intermediate electrode to establish a Z-pinch plasma that flows between the intermediate electrode and the first end of the inner electrode. In this context, the intermediate electrode is positioned at a first end of the outer electrode.

For example, the power supply 315 might apply a voltage 915 between the inner electrode 302 and an intermediate electrode 303 to establish a Z-pinch plasma 918 that flows between the intermediate electrode 303 and the first end 318 of the inner electrode 302. The Z-pinch plasma 918 is established when the plasma 916 moves beyond the acceleration region 310. The Z-pinch plasma 918 flows in the assembly region 326 within the outer electrode 304 between the first end 318 of the inner electrode 302 and the intermediate electrode 303.

Applying the voltage between the inner electrode 302 and the intermediate electrode 303 might include commencing applying the voltage between the inner electrode 302 and the intermediate electrode 303 17-27 μs or 19-22 μs after commencing applying the voltage between the inner electrode 302 and the outer electrode 304.

It should be noted that blocks 906 and 908 might also be implemented by other means of controlling (a) the voltage between the inner electrode 302 and the outer electrode 304 and (b) the voltage between the inner electrode 302 and the intermediate electrode 303, as one of skill in the art will recognize. For example, a power supply might provide a voltage between the intermediate electrode 303 and the outer electrode 304, instead of between the inner electrode and the intermediate electrode. The voltage 915 applied by the power supply 315 between the inner electrode 102 and the intermediate electrode 303 might be within a range of 2 kV to 30 kV. The voltage 915 might be applied for a duration 942 (see FIG. 14) within a range of 50 to 400 μs.

The Z-pinch plasma 918 may exhibit sheared axial flow and have a radius between 0.1 mm and 5 mm, an ion temperature between 900 and 2000 eV, an electron temperature greater than 500 eV, an ion number density greater than $1 \times 10^{23}$ ions/m$^3$ or an electron number density of greater than $1 \times 10^{23}$ electrons/m$^3$, a magnetic field over 8 T, and/or may be stable for at least 10 μs.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

The invention claimed is:

1. A plasma confinement system, comprising:
an outer electrode;
an inner electrode, wherein a first end of the inner electrode is between a first end of the outer electrode and a second end of the outer electrode, and wherein the inner electrode and the outer electrode have radial symmetry with respect to a same axis;
an insulator between the inner electrode and the second end of the outer electrode;
a vacuum chamber that at least partially surrounds the inner electrode and the outer electrode;
two or more valves configured to direct gas from outside the outer electrode; and
a power supply configured to apply a voltage between the inner electrode and the outer electrode to cause a Z-pinch plasma having a sheared axial flow to be established between the inner electrode and the outer electrode.

2. The plasma confinement system of claim 1, wherein:
the insulator comprises a ceramic material;
the vacuum chamber is a stainless steel vessel; and
the two or more valves are electrically actuated.

3. The plasma confinement system of claim 1, wherein the power supply is configured to apply the voltage for a duration within a range of 50 μs to 400 μs.

4. The plasma confinement system of claim 1, wherein the two or more valves are located at the second end of the outer electrode.

5. The plasma confinement system of claim 1, wherein the inner electrode and the outer electrode are concentric.

6. The plasma confinement system of claim 1, wherein the outer electrode surrounds a majority of a volume occupied by the inner electrode.

7. The plasma confinement system of claim 1, wherein the outer electrode substantially surrounds the inner electrode.

8. The plasma confinement system of claim 1, wherein each of the inner electrode and the outer electrode has a substantially cylindrical body.

9. The plasma confinement system of claim 1, wherein the first end of the outer electrode is opposite to the second end of the outer electrode.

10. The plasma confinement system of claim 1, wherein the sheared axial flow is radially sheared with respect to the same axis.

11. The plasma confinement system of claim 1, wherein the power supply is configured to apply the voltage between the inner electrode and the outer electrode to cause the Z-pinch plasma to be established by evolving an axisymmetric plasma front between the inner electrode and the outer electrode.

12. A method, comprising:

converting a gas, directed via two or more valves from outside an outer electrode, into a plasma flowing axially within an acceleration region and toward a first end of an inner electrode and a first end of the outer electrode, the acceleration region being between a second end of the outer electrode and the first end of the inner electrode; and applying, via a power supply, a voltage between the inner electrode and the outer electrode to establish a Z-pinch plasma between the inner electrode and the outer electrode, the Z-pinch plasma exhibiting a sheared axial flow, whereupon the establishing, the Z-pinch plasma flows between the first end of the inner electrode and the first end of the outer electrode in an assembly region within the outer electrode.

13. The method of claim 12, wherein:

the first end of the inner electrode is between the first end of the outer electrode and the second end of the outer electrode;

the inner electrode and the outer electrode have radial symmetry with respect to a same axis;

an insulator is positioned between the inner electrode and the second end of the outer electrode; and a vacuum chamber at least partially surrounds the inner electrode and the outer electrode.

14. The method of claim 12, wherein the two or more valves are operated by providing the two or more valves with a control voltage.

15. The method of claim 12, wherein the acceleration region has a substantially annular cross section.

16. The method of claim 12, wherein the assembly region is a cylindrical volume surrounded by the outer electrode.

17. The method of claim 12, wherein the power supply applies the voltage for a duration within a range of 50 µs to 400 µs.

18. The method of claim 12, wherein the applied voltage is within a range of 2 kV to 30 kV.

19. The method of claim 12, wherein the applied voltage results in a radial electric field within the acceleration region within a range of 30 kV/m to 500 kV/m.

20. The method of claim 12, wherein applying the voltage between the inner electrode and the outer electrode to establish the Z-pinch plasma comprises evolving an axisymmetric plasma front between the inner electrode and the outer electrode.

\*    \*    \*    \*    \*